US008150864B2

(12) United States Patent
Williams et al.

(10) Patent No.: US 8,150,864 B2
(45) Date of Patent: Apr. 3, 2012

(54) AUTOMATED MONITORING AND CONTROL OF ACCESS TO CONTENT FROM A SOURCE

(75) Inventors: Brian R Williams, Seattle, WA (US); Matthew J Rubens, Seattle, WA (US); Daniel Bibireata, Seattle, WA (US); Varun Narang, Issaquah, WA (US); Hilliard B Siegel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1242 days.

(21) Appl. No.: 11/392,245

(22) Filed: Mar. 29, 2006

(65) Prior Publication Data
US 2006/0212435 A1 Sep. 21, 2006

Related U.S. Application Data

(63) Continuation-in-part of application No. 10/750,166, filed on Dec. 31, 2003, now Pat. No. 7,174,054, which is a continuation of application No. 10/669,088, filed on Sep. 23, 2003, now Pat. No. 7,496,560, and a continuation of application No. 10/668,690, filed on Sep. 23, 2003, now Pat. No. 7,149,353.

(51) Int. Cl.
*G06F 17/30* (2006.01)
(52) U.S. Cl. ........ 707/757; 707/732; 707/781; 707/783; 707/786; 705/52; 705/54; 705/57
(58) Field of Classification Search .................. 707/1, 3, 707/9, 100, 200, 4, 5, 732, 757, 781, 783, 707/784, 786; 382/190, 305; 705/64, 57, 705/54, 58, 52
See application file for complete search history.

(56) References Cited

U.S. PATENT DOCUMENTS 5,623,681 A 4/1997 Rivette
(Continued)

FOREIGN PATENT DOCUMENTS

EP 0596247 A2 5/1994
(Continued)

OTHER PUBLICATIONS

Consumer ReportsTM, Archive Web site www.consumerreports.org, Archived on Dec. 2, 2000 by The Wayback Machine at www.archive. org, pages numbered as page Nos. 1-16.

(Continued)

*Primary Examiner* — Tim T Vo
*Assistant Examiner* — Dangelino Gortayo
(74) *Attorney, Agent, or Firm* — Knobbe, Martens, Olson & Bear LLP

(57) ABSTRACT

A provider of content may provide access to portions of content from a source, but not the source content in its entirety. In some embodiments, one or more access rules or criteria may be implemented that enable users to access portions of the source content up to an allowed limit or threshold (e.g., number or percentage of pages), after which access is prevented to the remaining content that has not previously been accessed. In other embodiments, one or more access rules or criteria may be implemented that enable users to access portions of content of only a certain type (e.g., index, bibliography, introduction, certain chapters, etc.). Unauthorized portions are suppressed or access to them is denied. The content source may be a textual work, an audio work, or a video work of any form. For example, the content may be in electronic form, such as images of pages of content.

66 Claims, 13 Drawing Sheets

U.S. PATENT DOCUMENTS

| | | | | |
|---|---|---|---|---|
| 5,761,485 | A | 6/1998 | Munyan | |
| 5,809,318 | A | 9/1998 | Rivette | |
| 5,821,929 | A | 10/1998 | Shimizu | |
| 5,832,126 | A | 11/1998 | Tanaka | |
| 5,857,203 | A | 1/1999 | Kauffman | |
| 5,933,498 | A * | 8/1999 | Schneck et al. | 705/54 |
| 5,957,697 | A | 9/1999 | Iggulden | |
| 5,960,448 | A | 9/1999 | Reichek | |
| 5,963,916 | A | 10/1999 | Kaplan | |
| 5,970,483 | A | 10/1999 | Evans | |
| 5,987,448 | A | 11/1999 | Evans | |
| 5,995,978 | A | 11/1999 | Cullen | |
| 5,999,664 | A | 12/1999 | Mahoney | |
| 6,043,823 | A | 3/2000 | Kodaira | |
| 6,115,709 | A * | 9/2000 | Gilmour et al. | 705/7.29 |
| 6,226,631 | B1 | 5/2001 | Evans | |
| 6,314,409 | B2 * | 11/2001 | Schneck et al. | 705/54 |
| 6,331,865 | B1 | 12/2001 | Sachs | |
| 6,353,831 | B1 | 3/2002 | Gustman | |
| 6,363,179 | B1 | 3/2002 | Evans | |
| 6,373,992 | B1 | 4/2002 | Nagao | |
| 6,385,614 | B1 * | 5/2002 | Vellandi | 707/9 |
| 6,397,213 | B1 | 5/2002 | Cullen | |
| 6,442,576 | B1 | 8/2002 | Edelman | |
| 6,449,627 | B1 | 9/2002 | Baer | |
| 6,449,636 | B1 | 9/2002 | Kredo | |
| 6,453,079 | B1 | 9/2002 | McInerny | |
| 6,522,782 | B2 | 2/2003 | Pass | |
| 6,532,461 | B2 | 3/2003 | Evans | |
| 6,556,704 | B1 | 4/2003 | Chen | |
| 6,562,077 | B2 | 5/2003 | Bobrow | |
| 6,594,646 | B1 | 7/2003 | Okayama | |
| 6,599,324 | B2 * | 7/2003 | Saito et al. | 715/234 |
| 6,609,105 | B2 | 8/2003 | Van Zoest et al. | |
| 6,633,742 | B1 | 10/2003 | Turner | |
| 6,643,641 | B1 | 11/2003 | Snyder | |
| 6,694,331 | B2 | 2/2004 | Lee | |
| 6,701,350 | B1 | 3/2004 | Mitchell | |
| 6,721,729 | B2 | 4/2004 | Nguyen | |
| 6,782,144 | B2 | 8/2004 | Bellavita | |
| 6,802,000 | B1 | 10/2004 | Greene | |
| 6,809,741 | B1 | 10/2004 | Bates | |
| 6,915,294 | B1 | 7/2005 | Singh | |
| 6,925,444 | B1 | 8/2005 | McCollom | |
| 6,947,959 | B1 * | 9/2005 | Gill | 715/202 |
| 6,961,905 | B1 | 11/2005 | Cover | |
| 6,968,332 | B1 | 11/2005 | Milic-Frayling | |
| 6,973,445 | B2 * | 12/2005 | Tadayon et al. | 705/64 |
| 6,981,905 | B2 | 1/2006 | Yakou | |
| 7,007,034 | B1 | 2/2006 | Hartman | |
| 7,020,663 | B2 | 3/2006 | Hay | |
| 7,137,064 | B2 | 11/2006 | Kuppinger | |
| 7,149,353 | B2 | 12/2006 | Siegel et al. | |
| 7,174,054 | B2 | 2/2007 | Manber et al. | |
| 7,316,032 | B2 * | 1/2008 | Tayebi et al. | 705/51 |
| 7,346,668 | B2 * | 3/2008 | Willis | 709/219 |
| 7,403,924 | B2 * | 7/2008 | Sakamura et al. | 705/52 |
| 7,437,351 | B2 * | 10/2008 | Page | 707/3 |
| 7,496,767 | B2 * | 2/2009 | Evans | 713/193 |
| 7,506,365 | B2 * | 3/2009 | Hirano et al. | 726/5 |
| 7,509,270 | B1 * | 3/2009 | Hendricks et al. | 705/26 |
| 7,574,486 | B1 | 8/2009 | Cheng et al. | |
| 7,882,565 | B2 * | 2/2011 | Collins et al. | 726/27 |
| 2001/0007980 | A1 | 7/2001 | Ishibashi | |
| 2001/0012400 | A1 | 8/2001 | Wang | |
| 2002/0082922 | A1 | 6/2002 | Van Zoest | |
| 2002/0156740 | A1 | 10/2002 | Kasahara | |
| 2003/0012399 | A1 | 1/2003 | Wu | |
| 2003/0016855 | A1 | 1/2003 | Shinbata | |
| 2003/0023561 | A1 | 1/2003 | Stefik | |
| 2003/0050919 | A1 * | 3/2003 | Brown et al. | 707/2 |
| 2003/0061101 | A1 | 3/2003 | Seet | |
| 2003/0093312 | A1 | 5/2003 | Ukita | |
| 2003/0093336 | A1 | 5/2003 | Ukita | |
| 2003/0093382 | A1 | 5/2003 | Himeno | |
| 2003/0126267 | A1 | 7/2003 | Gutta | |
| 2004/0049598 | A1 | 3/2004 | Tucker et al. | |
| 2004/0122811 | A1 | 6/2004 | Page | |
| 2004/0137820 | A1 | 7/2004 | Yakou | |
| 2004/0205466 | A1 | 10/2004 | Kuppinger | |
| 2004/0205546 | A1 | 10/2004 | Blumberg | |
| 2004/0205632 | A1 | 10/2004 | Li | |
| 2005/0063612 | A1 | 3/2005 | Manber | |
| 2005/0063615 | A1 | 3/2005 | Siegel | |
| 2005/0096938 | A1 | 5/2005 | Slomkowski | |
| 2005/0097476 | A1 | 5/2005 | Arora | |

FOREIGN PATENT DOCUMENTS

EP 1132829 A2 9/2001

OTHER PUBLICATIONS

"Look Ahead Filtering of Internet Content," IBM Technical Disclosure Bulletin XP-000754118, vol. 40, No. 12, Dec. 1997.

Phelps, T.A., and R. Wilensky, "Multivalent Documents," Communications of the ACM (Association for Computing Machinery) 43(6):83-90, Jun. 2000.

Witten, I.H., et al., "Compression and Full-Text Indexing for Digital Libraries," Lecture Notes in Computer Science, Springer Verlag, Berlin, Germany, vol. 916, May 19, 1994, pp. 181-201.

Witten, I.H., et al., "Greenstone: Open-Source Digital Library Software With End-User Collection Building," Online Information Review, MCB University Press, UK, 25(5):288-297, 2001, <http://www.cs.waikato.ac.nz/{ihw/papers/01IHW-DB-SB-Greenstoneopen.pdf> [retrieved Jun. 26, 2007].

"Amazon Plan Would Allow Searching Texts of Many Books," New York Times Full Feed, Jul. 21, 2003, <http://www.hostingtech.com/news/2003/7/22>.

"Amazon Plan Would Allow Searching Texts of Many Books," techdirt, Jul. 21, 2003, <http://www.techdirt.com/articles/20030721/019252_F.shtml>.

"Amazon Plans Book-Text Search," CNN Money, Jul. 21, 2003, <http://money.cnn.com/2003/07/21/technology/amazon.reut/?cnn=yes>.

"Amazon Working on Book Search Database-NYTimes," Reuters, Yahoo!Finance, Jul. 21, 2003, <http://biz.yahoo.com/rc/030721/tech_amazon_database_1.html>.

Milliot, J., "Publishers Grudgingly Cooperative With Amazon Database Effort," Publishers Weekly, Sep. 15, 2003, <http://publishersweekly.reviewsnews.com/index.asp?layout=articlePrint&articleID=CA322659> [retrieved Sep. 15, 2003].

Fox, E.A., et al., "Users, User Interfaces, and Objects: Envision, a Digital Library," Journal of the American Society for Information Science 44(8):480-491, Sep. 1993.

Patel, A., "Access Control Mechanisms in Digital Library Services," Computer Standards & Interfaces 23:19-28, 2001.

Watanabe, T., et al., "Personal Interface Mechanism on Digital Library," Proceedings of the IEEE International Forum on Research and Technology Advances in Digital Libraries, Santa Barbara, Calif., Apr. 22-24, 1998, pp. 76-85.

* cited by examiner

AUTOMATED MONITORING AND CONTROL OF ACCESS TO CONTENT FROM A SOURCE

CROSS-REFERENCES TO RELATED APPLICATIONS

This application is a continuation-in-part of U.S. patent application Ser. No. 10/750,166, titled METHOD AND SYSTEM FOR ACCESS TO ELECTRONIC IMAGES OF TEXT BASED ON USER OWNERSHIP OF CORRESPONDING PHYSICAL TEXT, filed Dec. 31, 2003, which is a continuation of U.S. patent application Ser. No. 10/669,088, titled PERSONALIZED SEARCHABLE LIBRARY WITH HIGHLIGHTING CAPABILITIES, filed Sep. 23, 2003, and U.S. patent application Ser. No. 10/668,690, titled METHOD AND SYSTEM FOR SUPPRESSION OF FEATURES IN DIGITAL IMAGES OF CONTENT, filed Sep. 23, 2003. All of the foregoing are incorporated herein by reference.

FIELD OF THE INVENTION

The present invention is directed to systems and methods that provide user access to content from a source, and more particularly to providing access to content with appropriate monitoring and control.

BACKGROUND OF THE INVENTION

The information age has produced an explosion of content for people to read. This content includes traditional media such as books, magazines, newspapers, newsletters, manuals, guides, references, articles, reports, documents, etc., that exist in print, as well as electronic media in which the aforesaid works are provided in digital form. The Internet has further enabled an even wider publication of content in the form of document downloads, such as portable document files and e-books.

Given the vast sea of content that people encounter, it is not uncommon for a person to read something and later recall a memorable phrase or subject, but not remember the exact source of the phrase or subject. The person may attempt to obtain recently read items in an effort to find the phrase or subject, but searching these items in this manner can be tedious, time consuming, and unfruitful. A person may also simply wish to research a particular subject in a set of books or other content that the person owns, has read, or is otherwise aware of.

Separately, various search engines have attempted to catalogue Web pages available on the Internet. However, given the enormous amount of content published electronically on the Internet, searching the entire Internet for a phrase or subject in a particular source the reader recently read can be similar to finding a needle in a haystack. The reader may have to wade through pages and pages of search results provided by search engines, and in the end may still be unable to locate the desired source. Moreover, the desired source may not have been published on the Internet in the first place, and thus would not be included in this type of search.

Electronic searching of public library catalogs is also known, but such searching is limited to bibliographic information and other meta-information that describe the library content. Full text searching of public library content is not available, and even if it were, the search may produce results from sources that are not of interest to the user.

Moreover, once a source is located, a user may wish to access the content from the source. For example, a user may access electronic images of one or more pages of content from a book or other work. A challenge arises when a provider of electronic content is under a constraint to limit the amount of content from a source that can be made available to users. A provider may be permitted to provide access to portions of content from a source but not the source content in its entirety. For example, a provider may enable users to preview the content of a source by browsing through a portion of the content. In some cases, the portion to browse may be selected by the individual users, and in other cases, the portion to browse may result from a search for content as discussed above. In yet other cases, portions of the content from a source available for browsing may be dictated by the copyright holder and/or the provider of the source content. While traditional digital rights management (DRM) schemes have been used to control access to source content as a whole, traditional DRM has not been used, nor is it adaptable for use, in controlling access to portions of content from a source, especially where the portions of the content are not known or specified in advance. Accordingly, what is needed is a method and apparatus that enable users to access portions of content from a source, yet limit the amount of the source content that is provided and thus prevent unauthorized efforts by one or more users to obtain the source content in its entirety.

SUMMARY OF THE INVENTION

In accordance with embodiments of the invention, a library owner or other provider of content may implement access rules that result in automatic monitoring and controlling of the amount or type of content accessed from a source. The content source may be a textual work, an audio work or a video work of any form. A provider may be permitted to provide access to portions of the content from a source, but not the source content in its entirety. Accordingly, the unauthorized portions of content are "embargoed" from further access. In such circumstances, one or more access rules may be implemented that enable users to access portions of the source content that satisfy a certain criteria based on amount or type of content. For example, one or more access rules may be implemented that enable users to access portions of content up to an allowed amount or limit (e.g., number or percentage of pages or chapters), after which access is prevented to the remaining content that previously has not been accessed. As yet another example, one or more access rules may be implemented that enable users to access portions of content of only a certain type (e.g., index, bibliography, introduction, certain chapters, etc.). Once embargoed, however, the library owner or other provider may still grant access to excerpts of the embargoed content.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
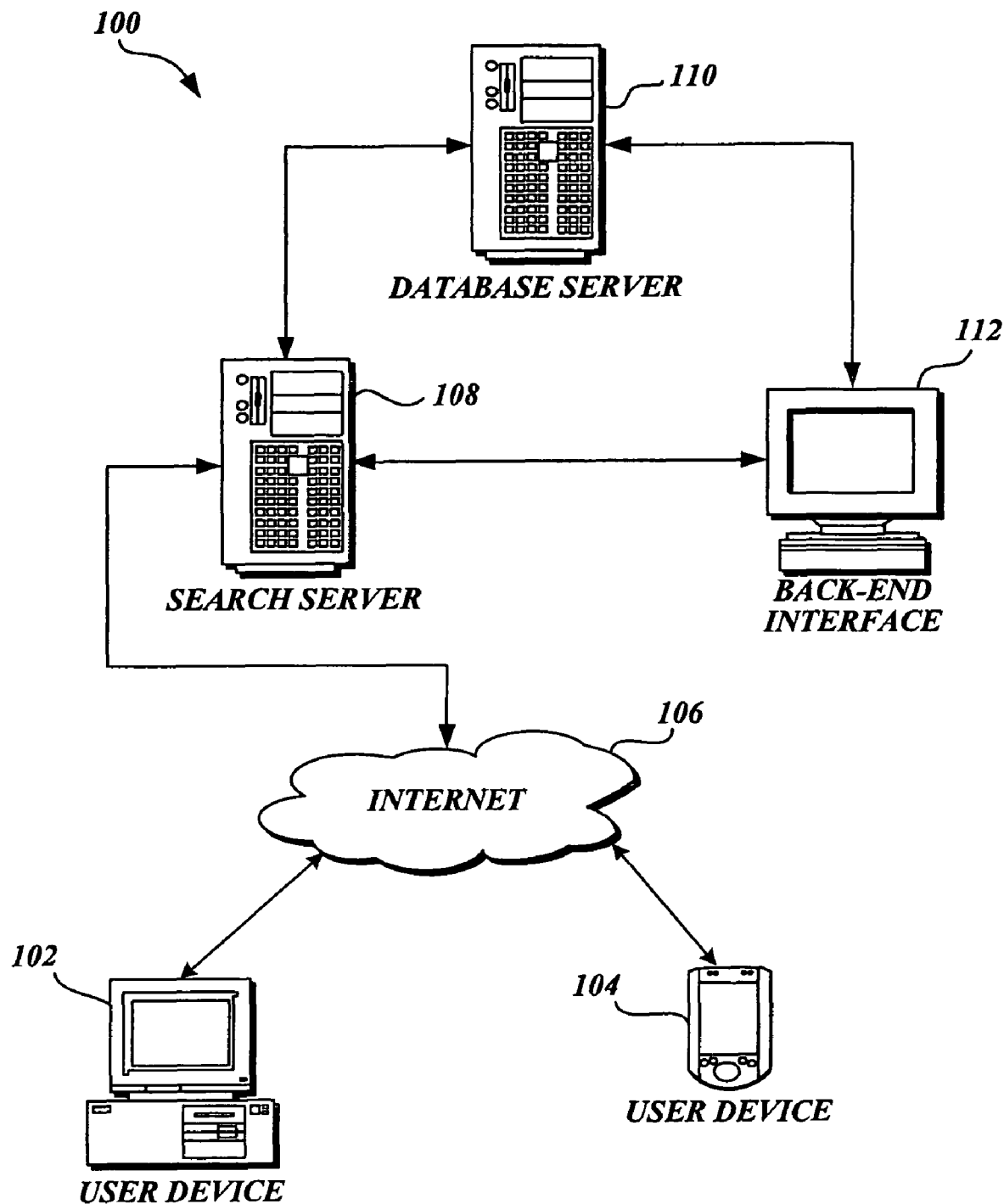
FIG. 1 is a pictorial diagram showing an environment for implementing one exemplary embodiment of the invention.

FIG. 1 illustrates one environment for implementing an embodiment of the present invention. As will be appreciated, different environments may be used, as desired, to implement different embodiments of the invention. The environment shown includes a library content system 100 with an electronically-searchable library of content that can be personalized by multiple individual users. The environment also includes various electronic user devices, such as a computer system 102 and a PDA 104, that individual users can use to communicate with the system 100. In the environment shown in FIG. 1, the user devices 102, 104 communicate with the system 100 via one or more computer networks, such as the Internet 106. Protocols and components for communicating via the Internet are well known to those of ordinary skill in the art of computer network communications. Communication between user devices 102, 104 and the system 100 may also be enabled by local wired or wireless computer network connections.

The system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could operate equally in a computer system having fewer or greater number of components than are illustrated in FIG. 1. Thus, the depiction of the system 100 in FIG. 1 should be taken as exemplary, and not limiting to the scope of the invention.

As illustrated, the system 100 includes a search server 108, a database server 110, and a back-end interface 112. Each of the servers 108 and 110 are described below in more detail. The back-end interface 112 allows an operator of the system 100 to monitor and adjust the operation of the servers 108 and 110 as needed.

In brief, the search server 108 is generally responsible for providing front-end user communication with various user devices, such as devices 102 and 104, and back-end searching and access control services in cooperation with the database server 110. The front-end communication provided by the search server 108 may include generating text and/or graphics, possibly organized as a Web page using hypertext transfer protocols, in response to information and search queries received from the various user devices 102, 104. The search server 108 also is generally responsible for conducting searches of the databases in the database server 110 and controlling access to content from sources stored in the database server 110. The database server 110, as described below, maintains the databases that the search server 108 uses to respond to user search and content access queries.

In one exemplary implementation provided herein to illustrate an embodiment of the invention, the system 100 enables a user to review an index that catalogs the general library of content in the databases stored in the database server 110. This general library of content may include various forms of publications, including (but not limited to) books, magazines, newspapers, newsletters, manuals, guides, references, articles, reports, documents, etc. To facilitate user review and selection of content from the general library, various metadata may be associated with the content in the general library. This metadata may include internal attributes, such as title, author, subject, abstract publisher, publication date and place, publication type, characters, etc. External attributes may also be associated with the content, such as sales popularity, user reviews, publisher promotion, related media, events, etc. The index that catalogs the general library may be organized and presented to the user according to one or more of these attributes.

In this embodiment of the invention, the user may select content from this general index of content to be included or otherwise associated in a personalized library for the user. The content in the user's personalized library, or "personal library," is electronically-searchable in all respects, thus enabling the user to search the full text of the content for specified terms (e.g., words, phrases, graphics, charts, pictures, or other text or non-text objects). Depending on access rights and permissions granted to the user, the results of a search may include some, all, or none of the full-text content in which the specified terms are found. Images of one or more pages of content or portions of pages of content that include the search terms may be delivered by the search server 108 to the user device 102, 104 for display to the user, e.g., in the form of a Web page image, a portable document image, a raster-based image, a vector-based image, etc. Images of content may be stored and delivered in .jpg, .gif, and/or .tif formats, for example. The search terms as found in the image display may also be highlighted by the user device 102, 104, as described later herein.

Selection of content to include in a user's personal library can be accomplished in a variety of ways. For example, a user may manually select content from a general library of content in a manner that specifically identifies the content that the user desires to include in his or her personal library. Automated selection of content based on other user actions may also be provided. For example, each time the user selects particular content for review or for purchase, that content may be added automatically to the user's personal library. Similarly, a content review or purchase history received from one or more sources may be used to automatically add content to the user's personal library.

As will be discussed below, a personal library enables a user to define and search a particular set of content. If desired, the user may establish a personal library prior to executing a search so that the search algorithm has a limited universe of content on which to act. In other circumstances, a personal library may be established in real time with the submission or execution of a search query or after the search has been executed on some broader library to define the scope of search results that are presented to the user.

Figure 2:
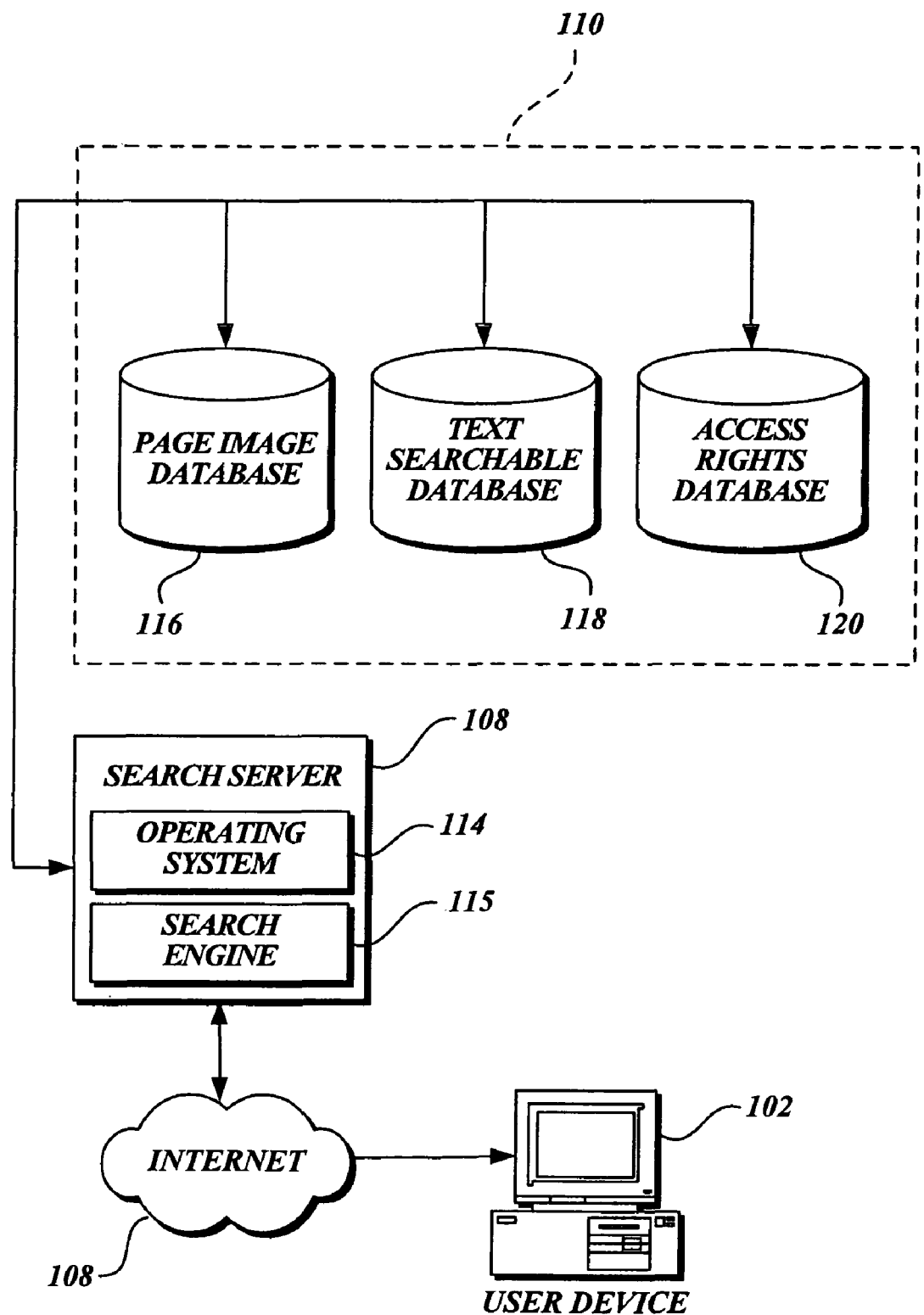
FIG. 2 is a block diagram depicting an arrangement of certain computing components for implementing the embodiment shown in FIG. 1.

FIG. 2 illustrates certain exemplary computing components that are responsible for the operation of the library content system 100 shown in FIG. 1. The search server 108, for example, is shown including an operating system 114 that provides executable program instructions for the general administration and operation of the search server 108. The search server 108 further includes computer program instructions for implementing a search engine 115 that operates in cooperation with the database server 110 to respond to user search queries. Suitable implementations for the operating system 114 and algorithms for the search engine 115 are known or commercially available, and are readily implemented by persons having ordinary skill in the art, particularly in light of the disclosure herein.

The database server 110, as illustrated in FIG. 2, includes a page image database 116, a text searchable database 118, and an access rights database 120. The database server 110 is configured to receive search instructions from the search engine 115 and return search results from the page image database 116 and/or text searchable database 118. The access rights database 120 enables the search server 108 to control the scope and nature of the content that can be accessed (e.g., displayed to the user as a result of a search). For example, a user may be permitted to view an entire image of a page of content, such as a book, that the user already owns. For content not owned by the user, the user may be permitted to view only a selected portion of a page image located by the search, with the remaining portions of the page image being suppressed. The access rights database 120 thus enables the server 108 to control the amount, type, or portions of content from a source that can be accessed by one or more users. Those of ordinary skill in the art will recognize that the search server 108 and database server 110 will typically employ a memory and main processor in which program instructions are stored and executed for operation of the servers. The database server 110 further includes executable program instructions for maintaining and updating the databases 116, 118, and 120, and responding to search and content access instructions received from the search engine 115.

For the sake of convenience, much of the description herein is provided in the context of searching and accessing the content of books, but it should be well understood that the present invention is applicable to searching and accessing other forms or sources of content, including other textual, audio, or video works. References herein to specific types of content sources, such as books, magazines, newspapers, etc., are only illustrative and do not serve to limit the general application of the invention.

In one aspect noted above, a library of content can be personalized by a user. A user's personalized library, or "personal library," includes only such content as selected by the user, either manually or automatically as a result of one or more user actions. In order to provide content that the user can select to include in his or her personal library, it is appropriate (though not required) to first create a general library of content. In one implementation discussed herein, libraries of content include both images of pages of content, as well as text searchable forms of the content. Page images are stored in the page image database 116, while searchable text corresponding to the page images is stored in the text searchable database 118. Further embodiments of the invention may allow a user to upload and store page images that are specific to the user's personal library. When permissible, the user may also add the uploaded content to the general library of content for selection by other users.

Figure 3:
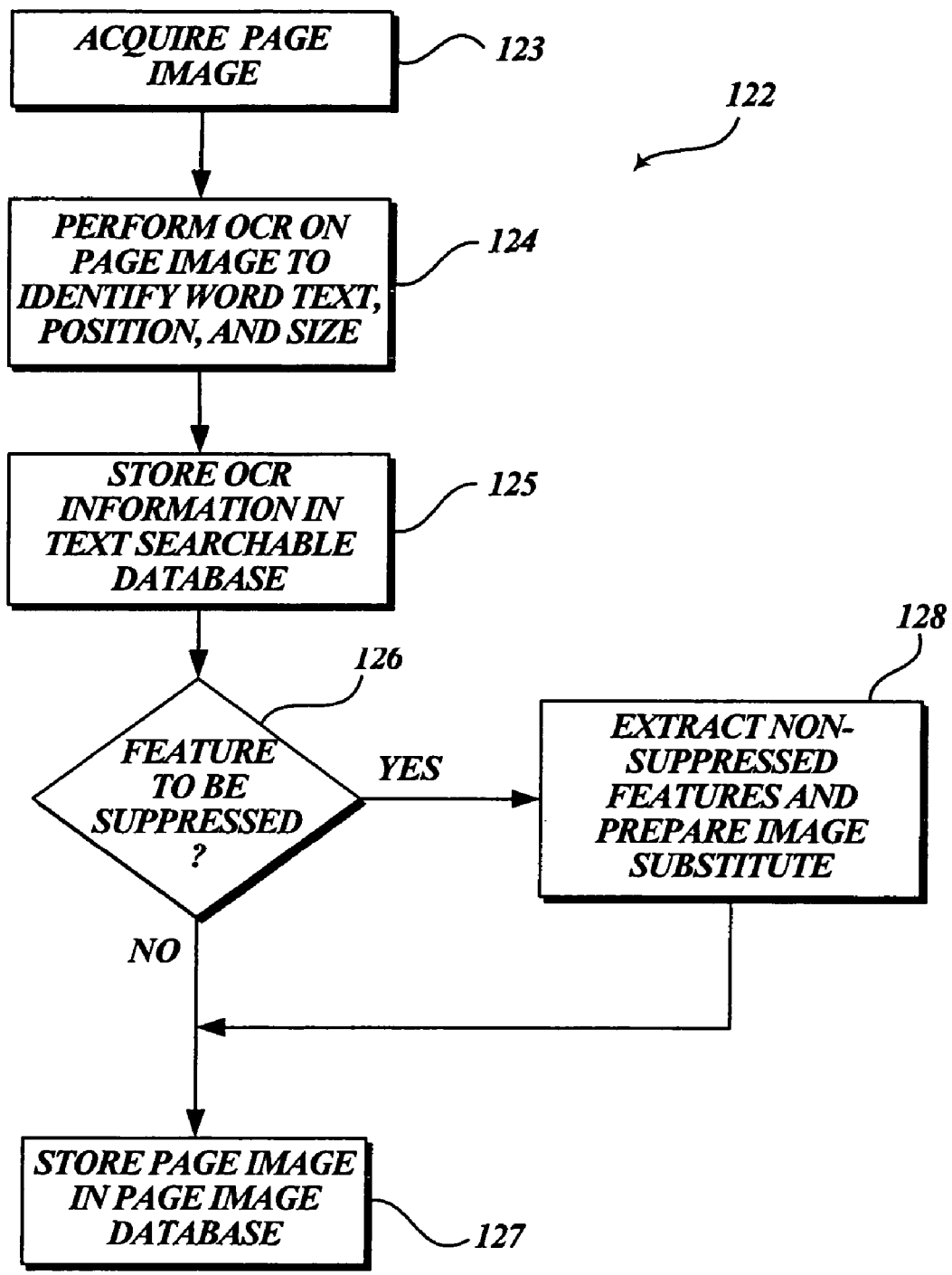
FIG. 3 is a flow diagram describing one embodiment of a process for preparing images of content and storing the images in a page image database, along with preparing and storing text of the content in a text searchable database.

One embodiment of a process 122 by which pages of content can be prepared and stored in the databases 116 and 118 is shown in FIG. 3. For each page of content to be included in the general library (from which different users' personal libraries may be defined) or in a user's personal library, images of each page of the content are acquired, as indicated at block 123. Image acquisition can be performed using methods known in the art, such as scanning printed pages, converting electronic text to document images, retrieving page images from memory, etc.

For each page of content, a recognition routine, such as an optical character recognition (OCR), may be performed on the page image as necessary to identify the text, position, and size of each word on the page, as indicated in block 124. It should be understood that a "word" encompasses any grouping of one or more characters, numbers, or symbols. Moreover, a word may stand alone or be associated with a non-text object, such as a picture or graphic. OCR routines are well known in the art of electronic document processing and do not require further discussion herein. As indicated at block 125, the resulting text, position, and size information obtained from each page image may be stored in the text searchable database 118.

The text searchable database 118 may be organized as desired, using data structures optimized for full text searching. In one suitable embodiment, words in the text searchable database 118 have associated therewith source content identification numbers (e.g., SKU numbers) and page numbers corresponding to images in the page image database 116 where the particular words are found. Furthermore, in association with the page numbers of the images in the page image database 116, the text searchable database 118 preferably includes information that identifies the position and size of the text (and possibly non-text objects associated with the text) as found on the respective page images. In one implementation, the position and size information is recorded as "quads," which include four numbers representing the X and Y position and the width and height of the text as it appears on a particular page image. All of this information may be encoded in the text searchable database 118 to reduce the storage space required.

A general library of content or personal library of content may be configured to include only that content for which the library owner has obtained valid rights to store, reproduce and distribute the content. Situations may arise in which a publisher of a book, for example, grants rights to a library owner to store and reproduce certain features found in a book, but restricts the reproduction of one or more other features in the book, e.g., for copyright or contractual reasons. Such features may include, for example, photographs, graphics, charts, names, numbers, dates, formulae, equations, pictures, and other text or non-text objects, or portions thereof. Features may also be characterized by size, font, and/or location on a page image. Whatever the case may be, a process is provided in which features in a page image can be suppressed so that when the page image or portion thereof is displayed to a user (e.g., as a result of a search), only the non-suppressed features of the page image are displayed. As will be described in more detail below, situations may also arise in which multiple portions (e.g., paragraphs, pages, chapters, etc.) of a work may be suppressed. For example, a library owner or other provider of access to content may be restricted from providing access to a content source in its entirety. Accordingly, portions of the source content are suppressed or access thereto is denied. However, the provider can still grant users access to other portions of the content, e.g., up to a threshold amount of the content.

Returning to FIG. 3, once the OCR information has been stored in the text searchable database 118, the process 122 determines in decision block 126 whether the acquired page has one or more features to be suppressed. If no features need to be suppressed, the originally-acquired page image is stored in the page image database 116, as indicated at block 127, for later retrieval.

On the other hand, if one or more features in a page image are to be suppressed, the process 122 proceeds to extract the non-suppressed features in the page image, as indicated at block 128, in order to prepare a substitute image that omits the features to be suppressed. One example of feature extraction in this regard is described in reference to FIGS. 4-6. The resulting substitute page image is then stored in the page image database 116 in place of the originally-acquired page image, as indicated at block 127. In some circumstances, it may be permitted to separately store the original page image in anticipation of later receiving rights to reproduce more or all of the original page, including previously suppressed features. Alternatively, it may be permitted to store a "negative" version of the page image in which the non-suppressed features are removed, but all else (including the suppressed feature(s)) remains. The original page image can be restored in this alternative case by combining both the "positive" and "negative" versions of the page image.

Figure 4:
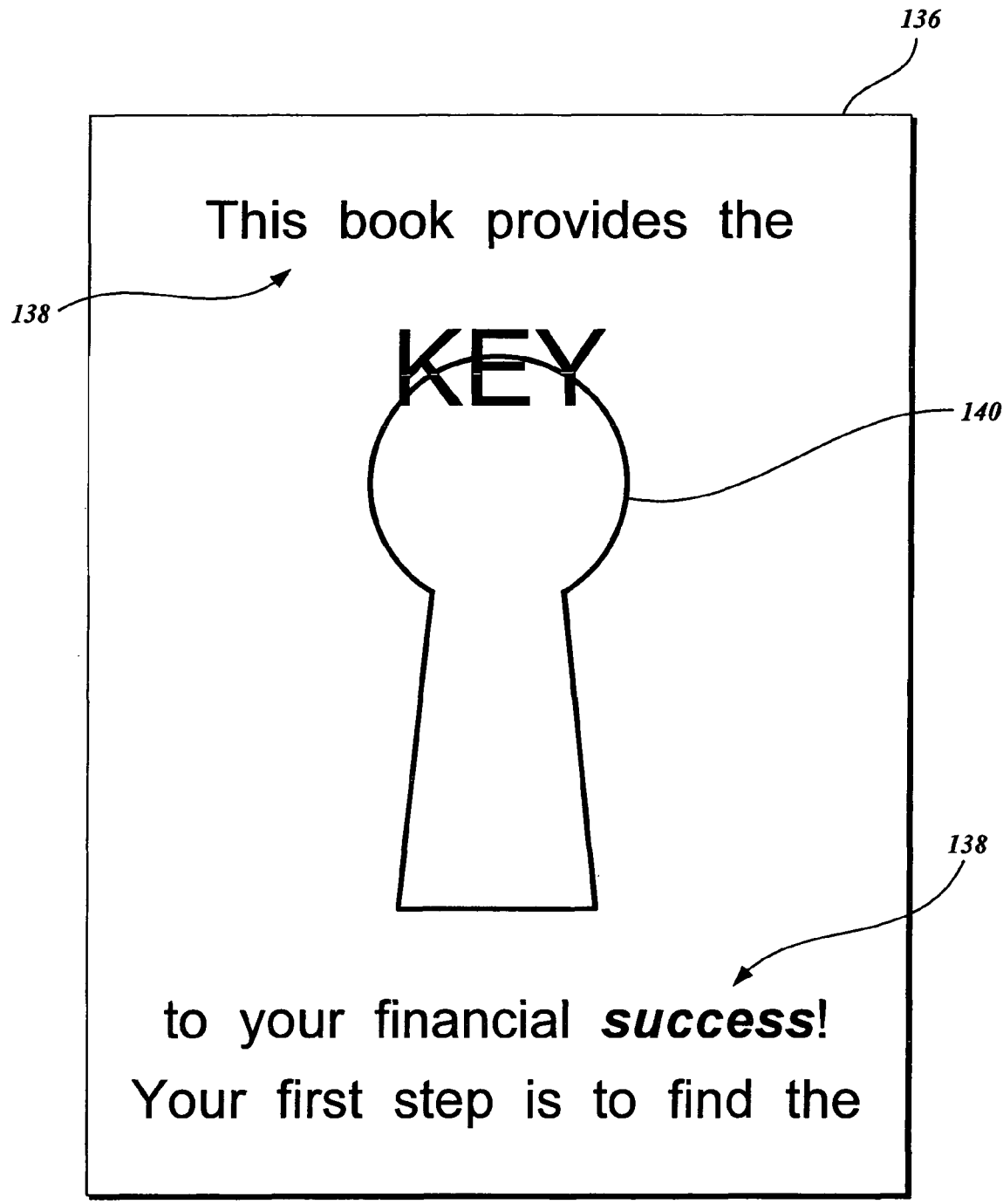
FIG. 4 is an example illustration of a page of content with text and a picture.
Figure 5:
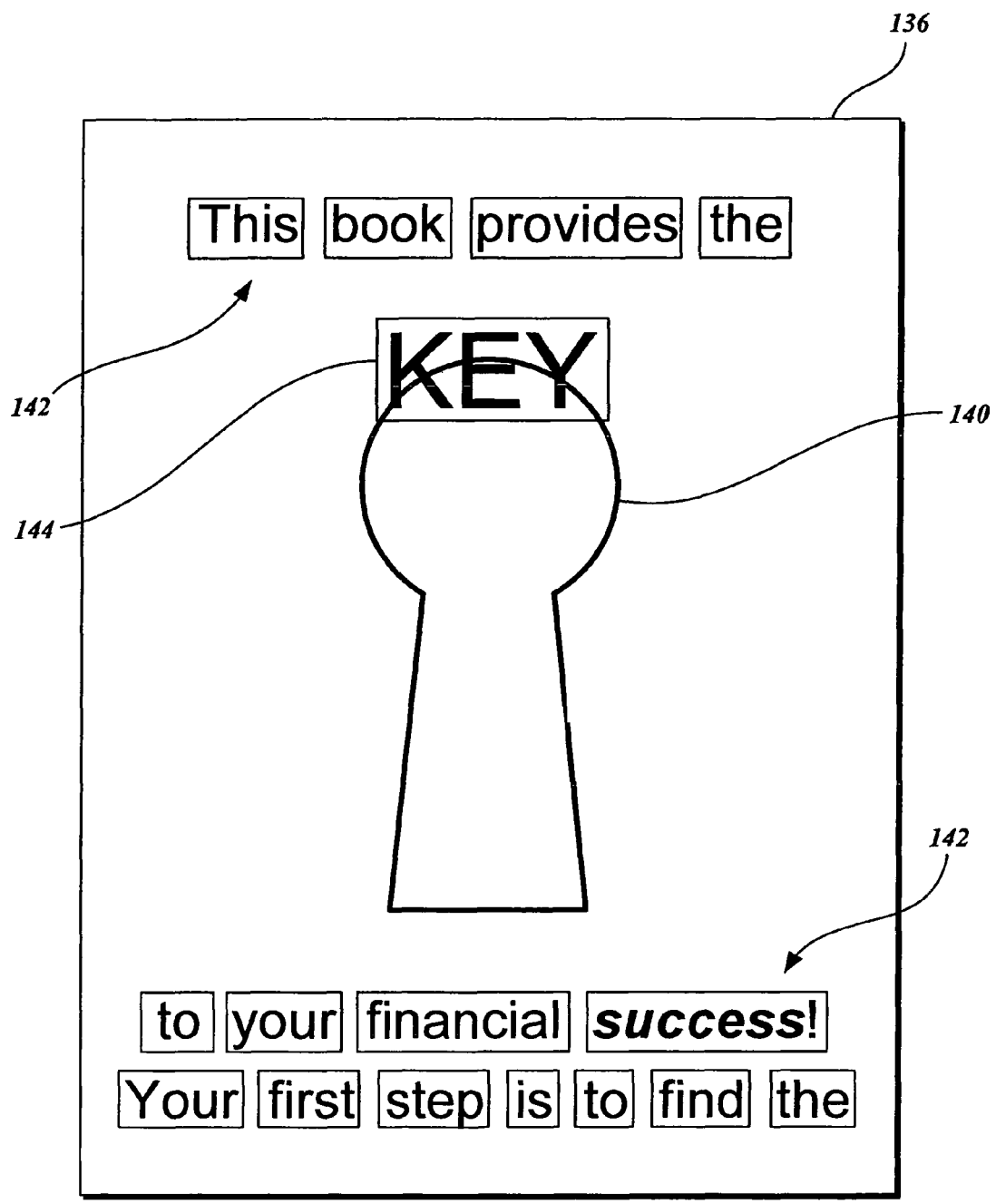
FIG. 5 illustrates the page shown in FIG. 4 with identified text shown in boxes.
Figure 6:
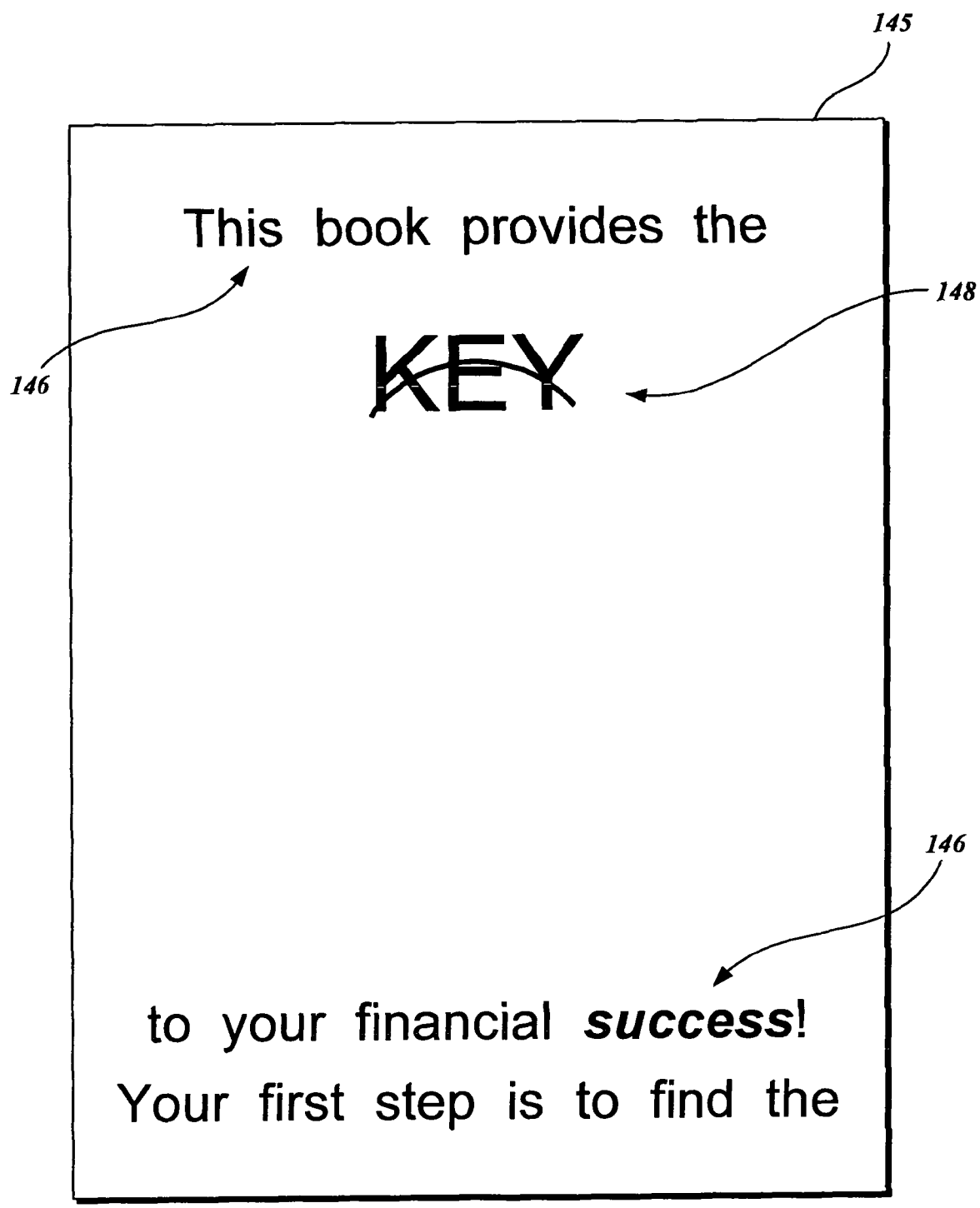
FIG. 6 illustrates a substitute page in which images of the text identified in FIG. 5 are copied and placed in the substitute page, thus effectively suppressing the picture in the original page shown in FIG. 4.

FIGS. 4-6 illustrate one exemplary process by which a feature (here, a picture) in a page image can be suppressed. FIG. 4 depicts a page image 136 that includes both text 138 and a picture 140. A first task in this process is to identify each word on the page image 136, as well as the location and size of each word. Conveniently, this can be achieved as part of the OCR process described earlier with respect to block 124 in FIG. 3. OCR approximation can also be used in this regard, which is often faster and can be conducted in real time, as opposed to typical OCR where each character of each word is independently and correctly recognized. OCR approximation returns the location and size of words, but does not necessarily recognize each individual character correctly. FIG. 5 illustrates the page image 136 in which each of the words on the page have been located and identified, as represented by the boxes surrounding each word, indicated by reference numeral 142. The word indicated at numeral 144 has also been located and identified, but the word 144 is separately noted herein because the background of the word includes a small portion of the picture 140.

Turning to FIG. 6, a substitute image 145 for the page image 136 is prepared by generating a blank image and then copying information for each identified word, such as pixel information, from the original page image 136 to the substitute image 145, as indicated generally by reference numeral 146. The words are placed on the substitute image 145 at the respective location that each word is found in the original image 136. By "cutting" only the pixel information for each word as contained in the boxes surrounding the words in FIG. 5, and "pasting" the pixel information in the substitute image 145, the picture 140 in the original image 136 is effectively suppressed. When the pixel information for the word image 144 is copied into the substitute image 145, as shown at reference numeral 148, the small part of the picture behind the word 148 may remain visible in the substitute image 145, though the picture 140 as a whole cannot be recognized. If desired, algorithms known in the art may be applied to the word image 144 to eliminate the background behind the letters. In any case, the amount of the picture 140 behind the word 148 represents only a small fraction of the original picture 140. In an alternative embodiment, a substitute image that suppresses a picture may be prepared by first identifying words in the original page image 136, e.g., as shown in FIG. 5, and then "erasing," or removing, all the pixel information in the page image outside the "boxes" that surround the identified words. The effect is the same as cutting and pasting the word images into a new (substitute) page image.

In some cases, the original page image 136 may have a background texture or color that is desired to be reproduced in the substitute image 145. One suitable method for preparing a substitute image 145 with a background similar to that of the original image 136 is to inspect one or more pixels in one or more corners of the original image 136 and reproduce the color and intensity of those pixels in the respective corners of the substitute page 145. The color and intensity from each corner may then be interpolated inward to the center of the page to complete a background for the substitute page 145 that simulates the background of the original image 136. In the alternate embodiment above, where pixel information outside the "boxes" is "erased," the pixel information may be differentiated between foreground pixel information and background pixel information with only the foreground pixel information being erased, leaving the background information in its place.

Feature suppression can vary depending on the type of content involved and the restrictions imposed. For example, a publisher of a recipe book may allow an ingredient list for a recipe to be shown to a user, but not the amount of ingredients. Using OCR techniques, numbers such as "5" and "five," for example, can be identified and suppressed, as well as fractions, using one of the feature suppression methods described above. Allowing a user to see an ingredient list (and perhaps the cooking instructions) allows the user to identify desirable recipes. The user may then seek to acquire the entire recipe, e.g., by electronic download or printed recipe book purchase. Similar procedures may be used by publishers of technical treatises or texts where numbers and/or equations are central operative features of the texts. Although the numbers and equations may be suppressed, the user is afforded an opportunity to view surrounding text and at the same time may be invited to purchase the text to view the operative numbers or equations. Different classes of information may thus be suppressed from the page images that are stored in the page image data base 116 and/or shown to the user. Suppression of a picture, as illustrated in FIGS. 4-6, is just one example of a class of information capable of suppression. Feature suppression may be performed prior to storing a (substitute) page image in the page image database or after retrieval of a page image from the database but before the page image is displayed to the user.

Figure 7:
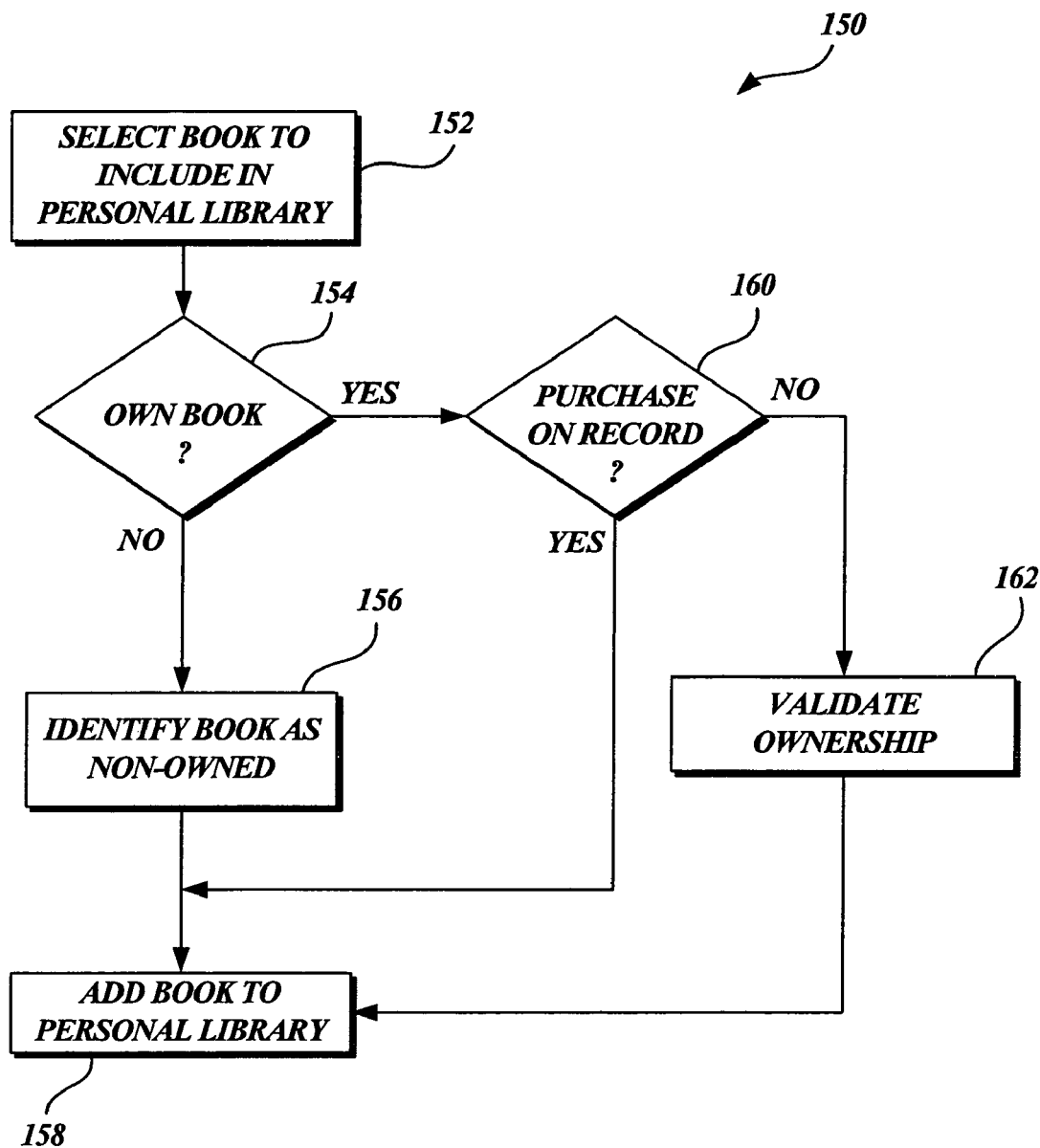
FIG. 7 is a flow diagram describing one embodiment of a process that enables a user to select and add content to be included in the user's personalized library.

Turning now to FIG. 7, a process 150 is described by which a user may establish or update a personal library of content that is selected from a general library of content, as stored in a page image database 116 and a text searchable database 118. As a first step 152 in the process 150, the user selects content from the general library and includes this content (or an electronic link thereto) in the user's personal library. By way of example only, the content described in FIG. 7 is in the form of a book, though the invention applies to other forms of content. As discussed earlier, in one embodiment, user-selection of content for a personal library may be accomplished by permitting the user to review an index of the content in the general library and manually select particular content (in this example, a book) to include in the user's personal library. For each selection at block 152, the process 150 determines at a decision block 154 whether the user owns the book. If the user does not own the book, the particular book is identified as non-owned by the user, as indicated at block 156, and added to the user's personal library, as indicated at block 158. Non-ownership of a book in a user's personal library may be indicated by an electronic flag associated with the book in the personal library.

Returning to decision block 154, if the user indicates that he or she owns the book, the process 150 attempts to confirm the user's ownership. In circumstances where the personal library searching service is provided by an entity that sells books, the entity may review its purchase information for the user to confirm that, in fact, the user owns the book, as indicated at reference numeral 160. The personal library searching service may also have partner agreements with other booksellers that can confirm purchase records for a user. Reviewing the user's purchase records may further be done automatically for books selected by the user in block 152, without querying the user whether he or she owns the book. Alternatively, a user's selection of a book for purchase may act to automatically add the book to the user's personal library.

In any regard, if the user's purchase of the book is confirmed, the process 150 proceeds to add the book to the user's personal library, as indicated at block 158. A flag may be associated with the book in the personal library to indicate that ownership of the book has been confirmed. After a book (or other content) has been added to the user's personal library, the user may choose to store the personal library in a computer memory for later retrieval. If desired, the system 100 may be configured to allow a user to establish and/or update multiple personal libraries in the computer memory.

If ownership of the book cannot be confirmed by reference to a purchase record or other data source for validation of ownership, the process 150 may ask the user to undergo additional steps to validate ownership of the book, as indicated at block 162. The user, for example, may be asked to submit copies of receipts evidencing purchase of the selected book. Alternatively, or in addition, the user may be asked to provide an image of one or more pages from the selected book to validate ownership of the book. In some circumstances, it may be sufficient for the user to indicate the party from whom the book was purchased, and the provider of the personal library searching service can independently confirm with the identified seller that in fact a purchase of the book was made. A determination of ownership of content selected for a personal library is not critical or necessary to the invention, but is helpful in circumstances where the amount and scope of content displayed to a user in a search is restricted in accordance with established ownership of the content.

As noted earlier, the database server 110 may include an access rights database 120 that controls the scope and nature of the content that can be accessed by a user. The access rights database 120 includes access rules that, when determined to be applicable, act to limit the content in the page images that are shown or otherwise provided to the user. Limitations on content access may be established for each individual user or groups or types of users, and may include, but are not limited to, one or more of the following: limits on the amount (e.g., percentage) of content that can be shown to or accessed by the user for any given page, title, or collection of content, limits on the total number of pages that can be shown or accessed for any given title or collection of content, limits on the amount or portion of content based on type of content, limits on the total number of pages that can be shown to or accessed by a user independent of content-specific limitations, and limits on the total number of pages that can be shown to or accessed by the user for any given search result. These limits may be imposed on a per search or access basis or in the aggregate for all of the searches and/or content accesses conducted by the user or users. These limits may also be imposed for specified time periods. For example, access rules may be written such that a user, group of users, or all users may not see more than a specified percentage of a given page of content, or other portion of the content, in a specified time frame, such as a 30-day time period, or 10 days in a 30-day cycle, or over the lifetime of the user.

Access rules may also serve to define the amount or type of content that can be provided to the user based on an identification of the user. A log in or registration routine may be employed to identify a user. The library content system 100 may implement user verification procedures to inhibit users from establishing multiple accounts to circumvent access limitations in the access rights database 120. For example, entry of a valid credit card number may be required for verification of user identification. The system 100 may further be set up to permit users to access content that is located only as a result of a search. In other words, the user is not permitted to access and view arbitrary pages, for example, in a browse mode (though the user may be able to browse one or more pages adjacent a page located in a search to give context to the located page). To carry out limitations such as these, the system 100 may be configured to monitor user activity for each user, including the identity of the page images (or portions thereof) that the user has viewed and the time frame in which the user has viewed the page images.

Access rules in the access rights database 120 may further be configured to apply differently for each individual user (or groups of users) depending on content-specific information, such as the type of content at issue. For example, access rules may be written to permit unlimited viewing of tables of contents and indexes of content but impose stricter limitations on viewing the body of the content itself.

User location can also act as a factor that determines which access rules govern a user's access to content at the time the content is produced for display to the user. For instance, different access rules may be written to enable a student in a classroom to access an entire body of content that is being used in the class, while the same student, at home, is only able to view a limited portion of the content. The domain of computer connection, for example, may be used to determine user location. Access rules may be written to apply differently based on the time the content is to be provided to the user, e.g., on different days or at different times of day, as well. Access rules may also be prepared and stored in the access rights database 120 so that once a portion of a page image has been displayed to a user, the user can always come back to view that portion, without impacting other limits on viewing new page images. In any event, the access rules may be written in programming code that a computer can interpret and execute to implement the access rules. Systems for writing and executing such code are known in the art of computer programming.

In yet further embodiments, a library owner or other provider of content may implement access rules that result in automatic monitoring and controlling of the amount or type of content accessed from a source. For example, a provider may be permitted to provide access to portions of the content from a source, but not the source content in its entirety. Accordingly, the unauthorized portions are suppressed or access to them is denied. In other words, the unauthorized portions are "embargoed" from further access. In such circumstances, one or more access rules may be implemented that enable users to access portions of the source content that satisfy a certain criteria based on amount or type of content.

For example, one or more access rules may be implemented that enable users to access portions of content up to an allowed amount or limit (e.g., number or percentage of pages or chapters), after which access is prevented to the remaining content that previously has not been accessed. As yet another example, one or more access rules may be implemented that enable users to access portions of content of only a certain type (e.g., index, bibliography, introduction, certain chapters, etc.). As noted above, the content source may be a textual work, an audio work, or a video work of any form. For example, the content may be in electronic form, such as images of pages of content, and accessible via a computer network.

Figure 13:
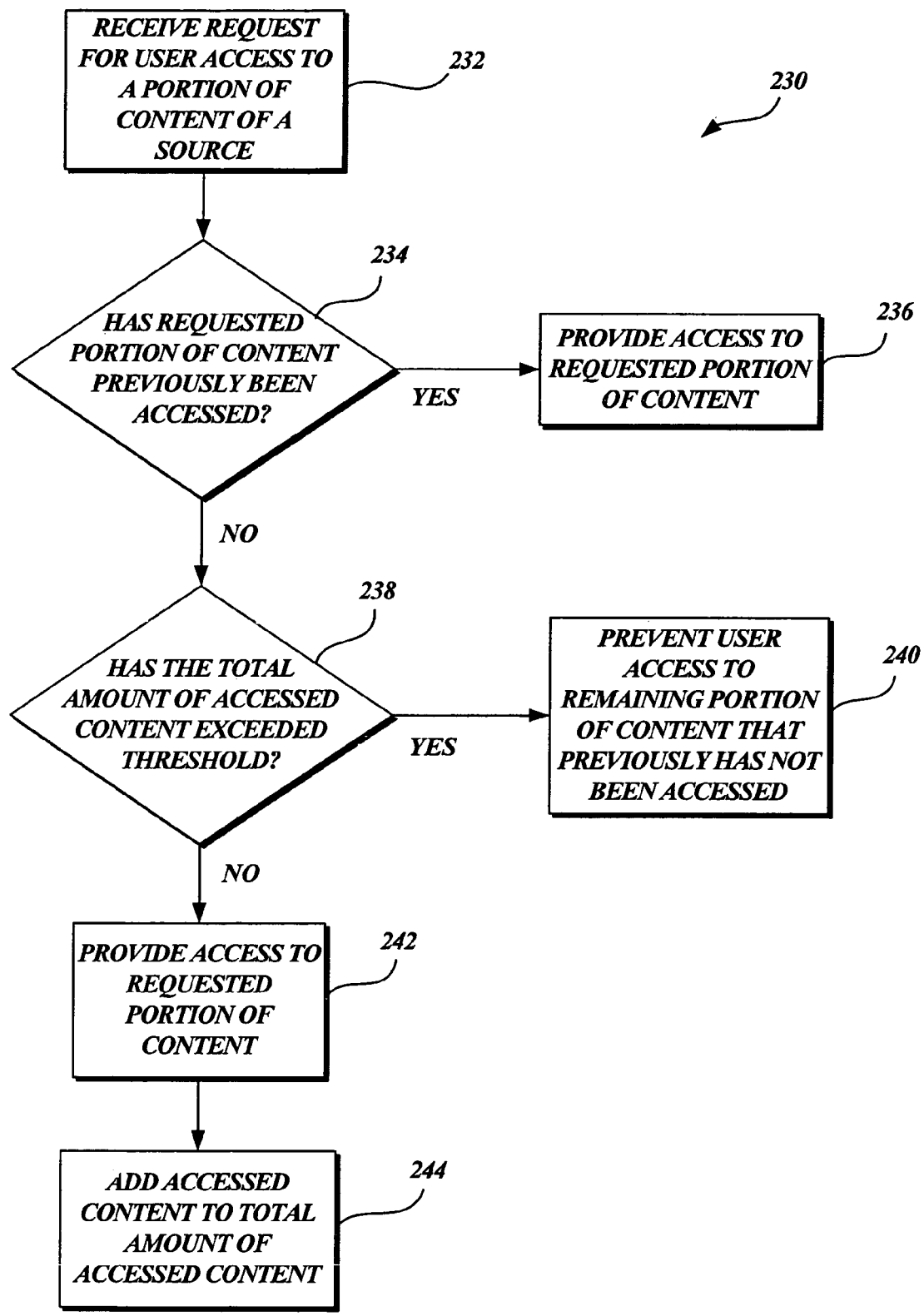
FIG. 13 is a flow diagram describing one embodiment of a process for automated monitoring and control of access to content from a source.

One exemplary embodiment of a process 230 for automatically monitoring and controlling access to content from a source based on amount is illustrated in FIG. 13. Briefly stated, the method 230 provides users with access to content from a source in which a user can access the content in portions (e.g., page by page, chapter by chapter, or by any other measurement or gauge of content), and while doing so, the method monitors user access of the portions of content and measures a total amount of content that has been accessed. When the total amount of accessed content meets or exceeds a threshold or other limit, the method automatically prevents the user from accessing the remaining content that has not previously been accessed.

In FIG. 13, at block 232, the method 230 begins when a request is received for user access to a portion of content from a source. The request for user access may be explicitly stated in a communication received from the user, or the request may be implied from activity of the user. For example, a user may identify a particular page of content and request to see an image of that particular page of content. In another example, search results that identify one or more portions of content satisfying a user search query may be provided to the user, along with controlled access to the content identified in the search results.

Regardless of how the request is received, the method 230 determines at decision block 234 whether the requested portion of content has previously been accessed. If so, it may be assumed that the amount of content accessed from the source by the user (or users, as the case may be) remains within an allowed limit. Previously accessed content is typically included in the total amount of accessed content that is compared with the allowed limit, and allowing further access to the previously accessed content does not increase the total amount of accessed content. In other words, repeated access to authorized content is allowed and not applied against the total. Accordingly, the method 230 proceeds to block 236 where access to the portion of content is provided to the requesting user and the method concludes.

Depending on the particular implementation of the method 230, access to content from a source may be monitored on an individual basis for different users, or access may be monitored for a group of (or all) users having access to the content, or both. In the latter circumstances, if any user in the group has previously accessed the requested portion of content, the portion can be deemed as having been previously accessed for all users in the group. In addition, a user may be a requester of any type capable of accessing content, e.g., a human or a system component, such as another computing device, software application, etc.

Returning to decision block 234, if the requested portion of content has not previously been accessed, then it is possible that the user (or users) may be attempting to access additional content in excess of the allowed limit. Accordingly, method 230 proceeds to decision block 238 where the total amount of content previously accessed from the source is compared against a threshold or other criteria to determine if the total amount of accessed content is still within an allowed limit. The threshold against which the total amount of accessed content is compared may assume any value or form, as desired. In one embodiment, the total amount of accessed content is measured and the threshold is set as a percentage of the content (e.g., 20% of the entire work, 20% of the first chapter, 50% of the total chapters, etc.) of the source. In another embodiment, the total amount of accessed content is measured and the threshold is set as a number of portions (e.g., paragraphs, pages, chapters, etc.) of the content of the source.

The threshold amount of accessed content may be determined before the content of the source is made available for user access. For example, a fixed threshold, such as 80% of the total source content, may be used to limit the total aggregate source content that is accessible to users. In another embodiment, the threshold may be determined after the content of the source has been made available for user access. In yet other embodiments, the threshold may vary over time and/or according to different circumstances. In one possible implementation, a variable threshold may allow access to a smaller portion of the content when the content is first made available (e.g., at a time when interest in the content is high) and over time, the threshold may increase allowing access to a larger portion of the content (e.g., as interest in the content begins to diminish). In other possible implementations, a variable threshold may decrease over time, or may both increase and decrease over time, as may be desired.

If, at decision block 238, the total amount accessed content meets or exceeds the threshold, the method 230 proceeds to block 240 and prevents the user from accessing any remaining portion(s) of the content that have not previously been accessed. These remaining unaccessed portions of the content are restricted (or embargoed) from user access. Where appropriate, a message may be provided to the user indicating that the requested content is unavailable.

If, at decision block 238, the total amount of accessed content does not exceed the threshold, the method 230 proceeds to block 242 and provides access to the requested portion of the content. The amount of newly accessed content is then added to the total amount of accessed content, as indicated at block 244. Accordingly, a running total of the accessed content is kept so that the next time access to the content is requested, the running total is compared to the threshold to determine if the total amount of accessed content is still within an allowed limit.

In one embodiment, a body of content from a source may be made available for user access. The body of content may comprise all of the content from the source or some lesser amount of the content from the source. In either case, the user may be given the ability to select the portion of the body of content that the user wishes to access. The identity of the content being accessed is thus not known until such time the user requests access to the content. In some circumstances, the user may select a portion of the content as a result of a search of the content based on a user search query. In other circumstances, the user may select a portion of the content based on a location of the portion of the content in the content available (e.g., by selecting a chapter, page number, section, etc.). In any event, an advantage of this embodiment is that, initially, all of the body of content of a source is available for access. A determination is not made in advance as to which portions of the body of content will or will not be embargoed.

Not until a threshold total of accessed content is reached is further access to the body of content subject to limitation. If a threshold of 80% is implemented, for example, all of the body of content is available for access until 80% of the body of content has been accessed. Thereafter, access to the remaining unaccessed portions of the body of content is restricted or otherwise limited. As discussed above, a variable threshold may provide greater flexibility to obtain a desired control over user access of the body of content. In addition, dynamically determining content availability as described herein may improve the users' experience because, presumably, the best 80% of the body of content is accessed first and remains available to the users, while the 20% of the body of content that is embargoed and becomes unavailable may be less relevant. A determination as to which 80% of the source to make available and which 20% to restrict does not have to be made beforehand (although in some embodiments it is). In addition, the threshold may be selected and/or modified dynamically as well, and may depend on other factors (e.g., the type of media of the source, the identity of the user(s), the access credentials of the user(s), the duration of access, etc.), if appropriate.

In yet another embodiment, access to the content is limited to particular types of content accessed (e.g., index, chapter, introduction, etc.), rather than by an amount of content accessed. In such embodiments, the method monitors user access of the portions of content and only allows access to those portions of content allowed by one or more access rules. For example, if an access rule is provided that grants access to the index of a book, and such access is attempted by the user, the user is granted access to the index portion of the book. However, if the user attempts access to a portion of the content denied or not otherwise allowed by an access rule, the method automatically prevents the user from accessing the remaining content. To ensure a particular portion of content is available for user access, the particular portion of content may be designated as having been accessed before a user has actually requested access to the portion of content. As earlier described, once a portion of content has been accessed (or designated as such), the portion of content typically remains available for later access and is not subject to embargo restrictions.

In yet a further embodiment, limited access may still be provided to content that is otherwise restricted or embargoed from user access. For example, suppose a user requests access to the content of a source and the total amount of accessed content of the source exceeds the threshold or access to the type of content is denied. Normally, the user is restricted from accessing the unauthorized content. In this further embodiment, the user may be provided access to limited excerpts of the content otherwise unauthorized. This limited access may be a "one time only" access and/or may depend on access credentials of the user. In yet another embodiment, an authorized command (e.g., from the library owner or access rights holder) may be received and enable one or more users to access the content that is otherwise restricted from user access. In yet further embodiments, a user may pay (i.e., provide compensation in some form such as money or by performing some user activity) for access to a portion of content that is otherwise embargoed. Such users may pay for incremental access or for complete access to the embargoed content. An implementation may exclude content accessed by users who pay for access from being added to the total accessed content that is measured for non-paying users.

Databases or other suitable storage entities may be used to record which portions of content have been accessed. In some circumstances, different databases may be established for different groups or segments of users (for example, users in different countries). For purposes of embargoing content as described herein, the recorded measures of accessed content may be kept separate in the different databases for the different groups of users, or may be aggregated into a single effective database. In one implementation of the latter, a access information may be aggregated by synchronizing the different databases so that a portion of content recorded in one database as having been accessed is recorded in the other databases as having been accessed.

For purposes of measuring and granting or limiting access to content from a source, as described herein, such content may be defined in any desirable manner. In one example, a book may be defined as content, and user access to portions of the book may be permitted up to a limit or threshold as discussed herein. In another example, a section of a book may be defined as content for purposes of applying access rules or criteria that limit user access to the content. In yet another example, multiple books may be grouped together and defined as content for purposes of applying access rules or criteria that limit user access to the content. Such grouping may be done according to an attribute such as author, publisher, series, genre, etc. shared by the books in the group. Again, access to the content (i.e., the aggregate of the group of books in this example) may be permitted up to a limit or threshold as discussed herein. Of course, these examples are provided only for illustration; other implementations may be employed with respect to any other form of content. Moreover, different thresholds, criteria, and/or access rules may be used for different content, and in some cases, may be constructed so as to promote certain user behavior. For example, an implementation may provide greater access to portions of an earlier edition of content and lesser access to a newer edition of the content, with a goal of encouraging the user to purchase access to the newer edition of the content.

Returning now to the feature of personal libraries as discussed earlier herein, it should be noted that the personal libraries of users need not duplicate the actual content stored in the general library. Rather, each user's personal library may be comprised of a listing of the content that the user has selected from the general library to include in his or her personal library. This personal listing of content may link to the actual content stored in the database server 110. By limiting the number of actual copies of the content in the database server 110, and allowing users' personal libraries to link to that content, the amount of storage space required for implementing a personal library searching service is reduced. Furthermore, providing a general library of content that is publicly accessible to users for defining personal libraries reduces or removes from users the burden of scanning content and creating searchable electronic copies of content for their personal libraries, not to mention obtaining legal clearance to produce copies of content, where such is necessary.

A user that has established and/or updated a personal library is able to electronically search the personal library, e.g., for content having text that matches one or more search terms provided by the user. A search conducted in this manner has significant advantages including (1) limiting the user's search to the particular content in the user's personal library; (2) conducting a full text search that encompasses the entire body of content in the user's personal library which is more comprehensive than a search encompassing only bibliographic and abstract data or metadata associated with the content; and (3) producing for immediate review by the user the actual images or portions of images of content resulting from the search. Additional advantages are evident from the description herein.

Figure 8:
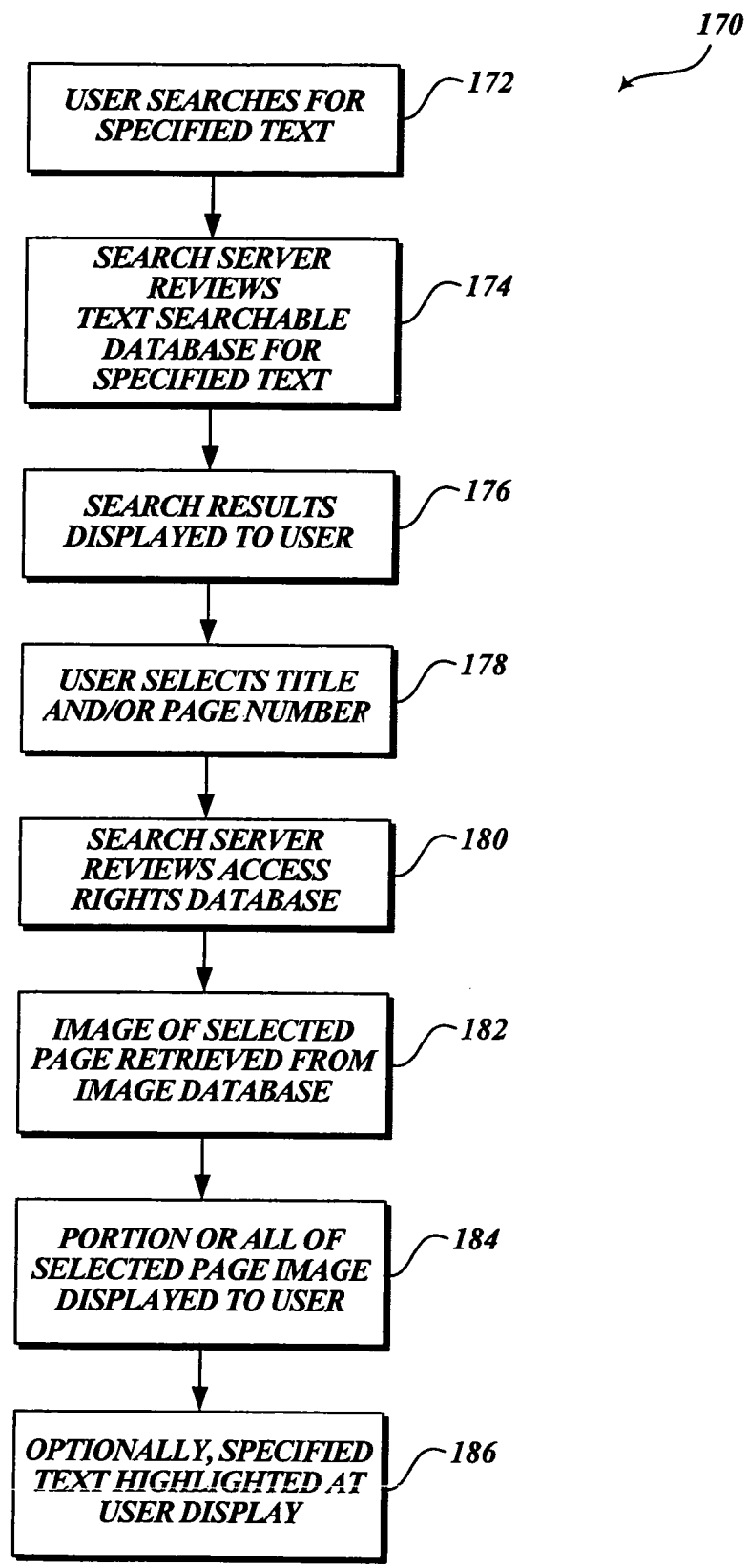
FIG. 8 is a flow diagram describing one embodiment of a process for searching and displaying content in the user's personalized library.
Figure 9:
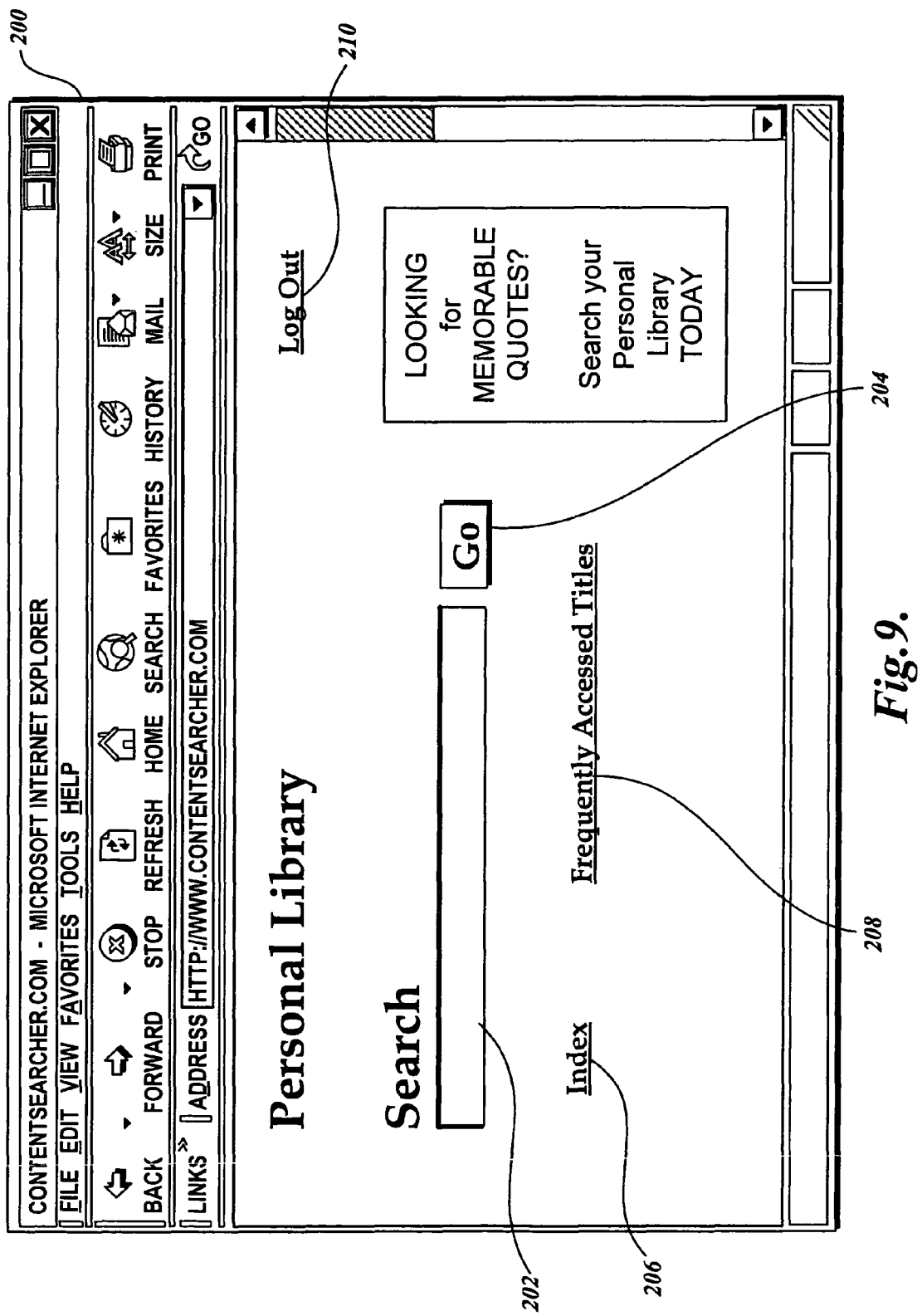
FIG. 9 depicts a browser program with an example Web page presenting a search input field to a user.

One embodiment of a process 170 for searching and viewing content in a personal library is described in reference to FIG. 8, with further reference to FIGS. 9-12. In FIG. 8, at block 172, a user initiates a search for specified text in the content in the user's personal library. In a Web-based implementation, one example of a Web page provided to the user for searching a personal library is illustrated in FIG. 9.

FIG. 9 illustrates a browser program 200 displaying a Web page in which the user is able to enter one or more search terms in a search entry box 202. The Web page may be generated by the search server 108 and delivered to the user's computing device 102, 104 via the Internet. The user enters the desired search terms in the box 202 and uses a pointing device, keyboard, or other input device to initiate the search, e.g., by clicking on the button "GO" identified at reference numeral 204. The Web page in FIG. 9 may include other hypertext links, such as an "Index" link 206 and "Frequently Accessed Titles" link 208, both providing additional information that can be assembled into one or more additional Web pages not illustrated. Clicking on the Index link 206 for example, may produce a Web page for the user that lists bibliographic data for all of the content presently included in the user's personal library. The Frequently Accessed Titles link 208 may produce, for example, a listing of the content most frequently accessed by the user.

Log in and log out routines may be employed by the search server 108 to provide users with secure access to their personal libraries. Suitable routines for verifying a user requesting access to a personal library (e.g., using a password) are well known in the art. In FIGS. 9-12, it is assumed the user has already logged in. A Log Out link 210 is illustrated and, when initiated, enables the user to discontinue the user's current session and log out of his or her account.

Returning to FIG. 8, at block 174, the search server 108 receives the user's specified search terms and initiates a search of the text searchable database 118 to identify the pages of content in the user's personal library that include the text of the search query. As noted earlier, the text searchable database 118 is preferably constructed to include information that identifies the corresponding images in the page image database 116 where the search terms can be found. Thus, when conducting a user search for specified terms, the text searchable database 118 not only identifies the particular content in the user's personal library that contains the specified text, but also identifies the corresponding page images in the page image database 116.

Figure 10:
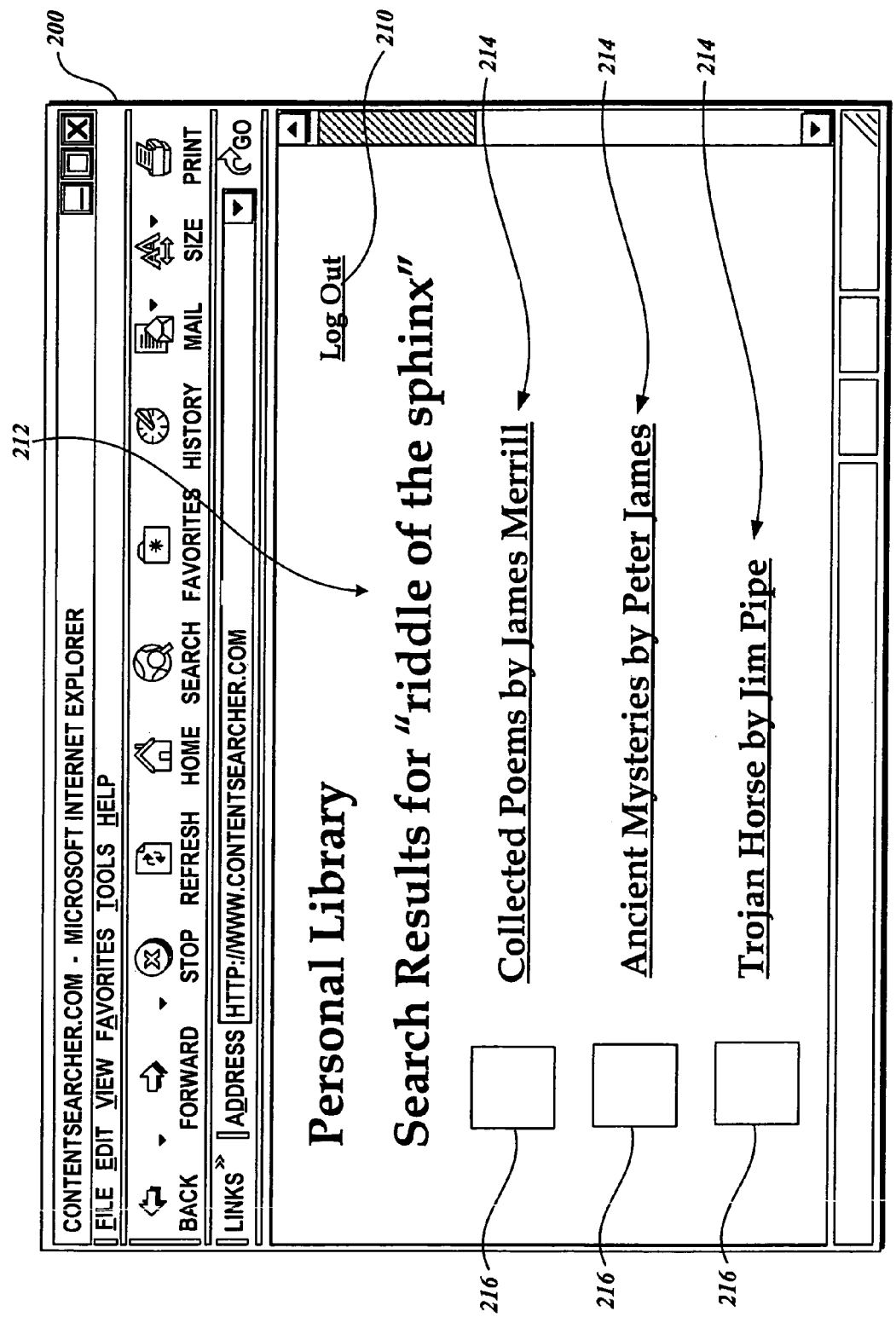
FIG. 10 depicts a browser program with an example Web page presenting the results of a sample search.

The results of the user's search performed in block 174 are displayed to the user, as indicated at block 176. FIG. 10 illustrates the browser program 200 displaying a Web page in which search results for a sample phrase "riddle of the sphinx" are shown at reference numeral 212. The search results 212 may be displayed in a variety of different formats. By way of example only, the search results 212 in FIG. 10 include a listing of title and author, as indicated at reference numeral 214, along with thumbnail images of the content, or portion thereof (such as a book cover), as indicated at reference numeral 216. Again, the search results 212 are generated from a search of the content selected by the user to be included in the user's personal library. In cases where there are numerous search "hits" in the user's personal library, the search server 108 may execute program instructions that analyze the hits and rank the "best" pages for display to the user according to a predetermined criterion, such as which pages are most relevant. Measures of relevance, for example, may include which pages have the most hits, which pages have hits in their title, which pages are drawn from best selling texts, etc.

Returning to FIG. 8, at block 178, the user may select particular content in the search results, e.g., identified by title and/or page number, for additional review. The search server 108 may immediately display images of the user-selected content to the user. However, in the embodiment shown in FIG. 8, the search server 108 at block 180 first reviews the access rights database 120 in the database server 110 to determine whether there are any access rules governing how much of, or even if, the content listed in the search results can be displayed to the user. As previously discussed, the access rights database 120 is a repository for rules that control the ability of users to access and, in this example, view the actual content in the library, e.g., beyond standard bibliographic information.

For instance, as noted earlier, different rules may be written to govern a user's access to content that is already owned by the user, as opposed to content not owned by the user. For user-owned content that is identified in the search results, the user may be permitted to access the entire body of that content including page images that precede or follow the pages on which the user's search terms are located. This includes, for example, operating manuals for products that the user has purchased.

Figure 11:
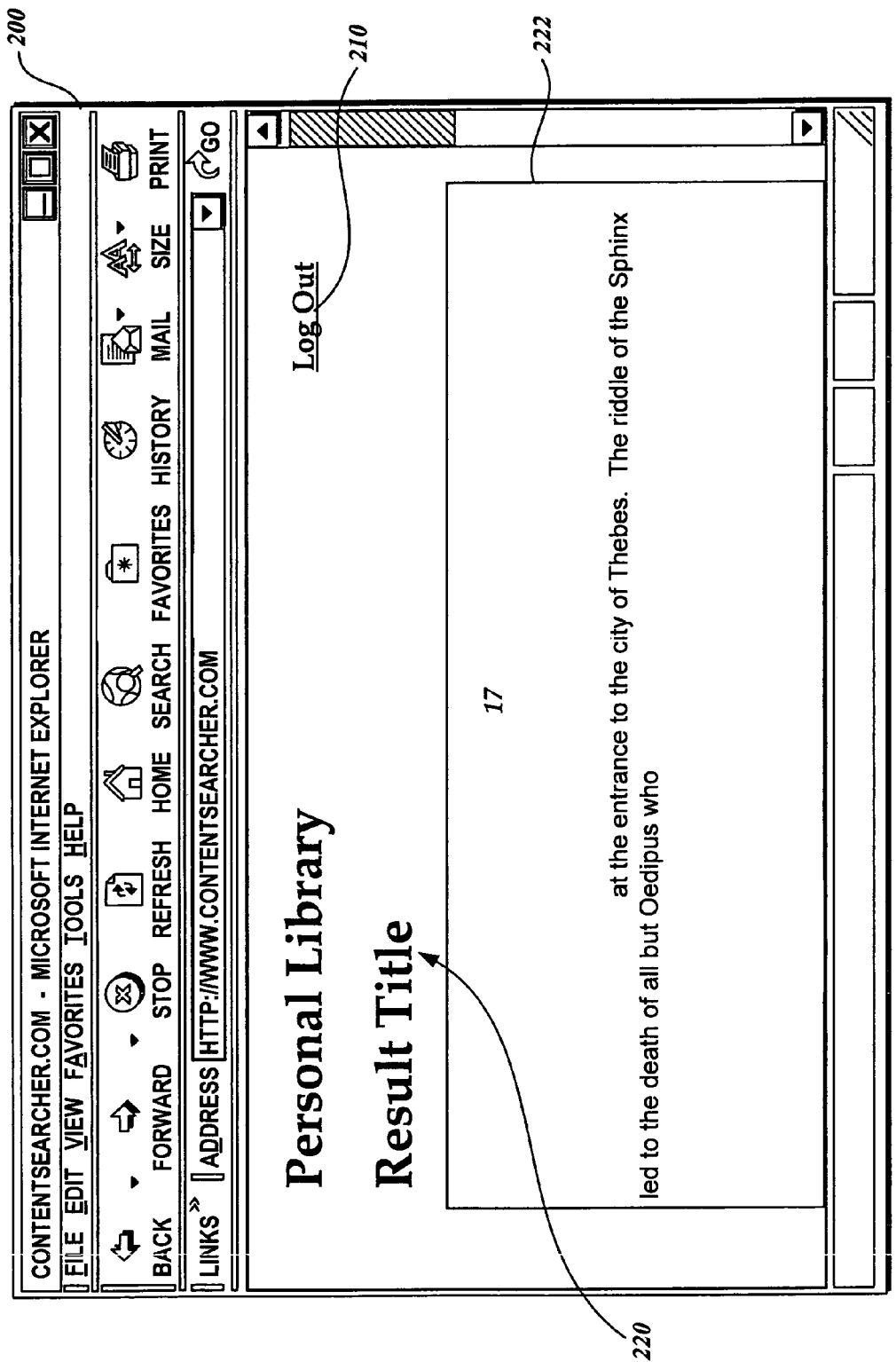
FIG. 11 depicts a browser program with an example Web page showing an image of a page from a selected search result.
Figure 12:
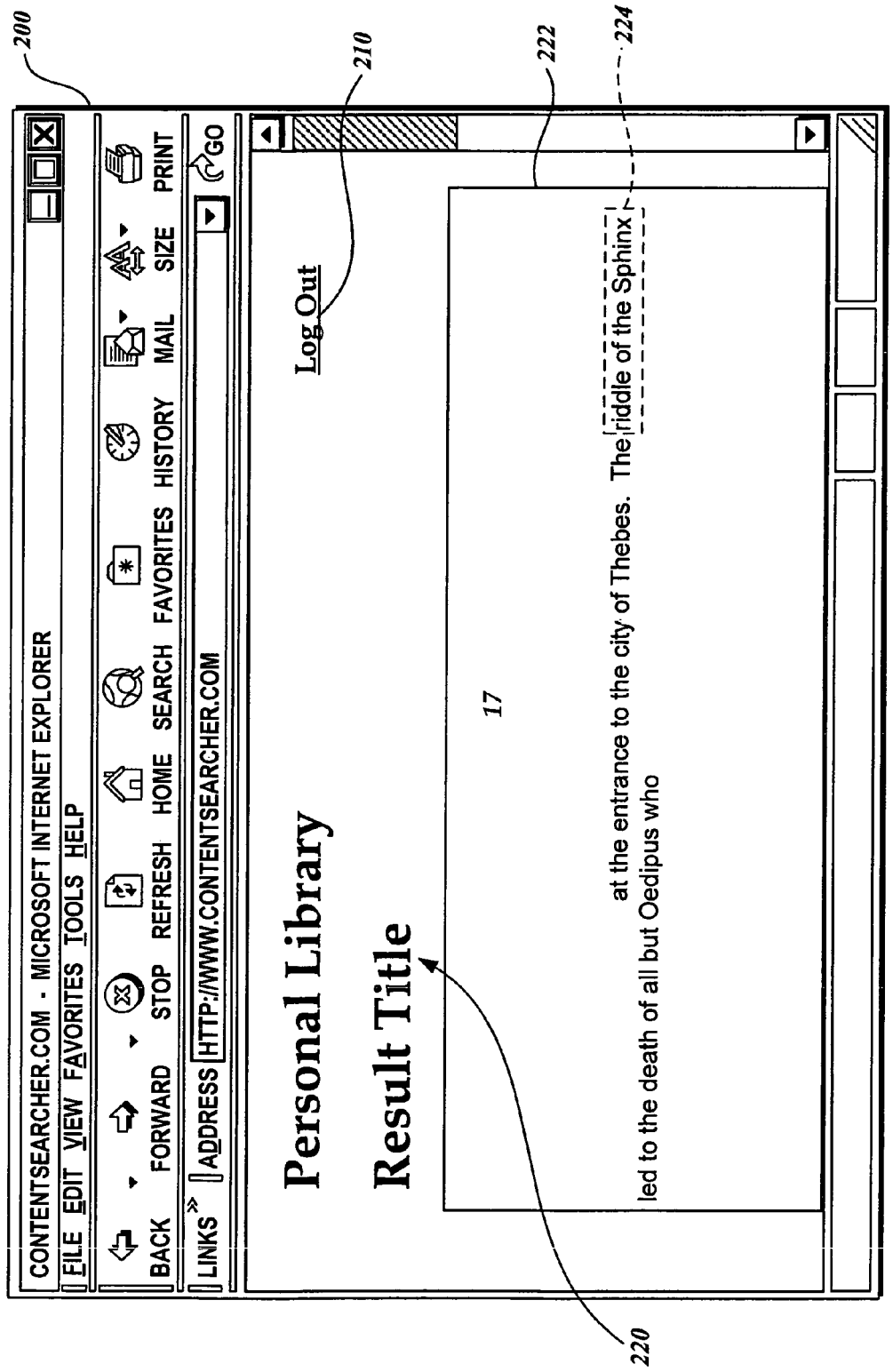
FIG. 12 depicts a browser program with a Web page as shown in FIG. 11 in which the search result is highlighted in accordance with the present invention.

For content that the user does not own, one or more rules in the access rights database 120 may act to limit the amount of content surrounding the located search terms that may be displayed to the user. For example, FIG. 11 illustrates a browser program 200 displaying a Web page for a particular title in the search results previously communicated to the user, such as shown in FIG. 10. The title of the search result, indicated at reference numeral 220, may be any of those in the search results 212, for example.

A sample page image 222 from the selected result title 220 is depicted in FIG. 11. The page image 222, in this instance, is an image of "page 17" from the result title 220 but does not include all of the content of the original page image. This redaction, or suppression, of content can be the result of a circumstance in which a user has limited access rights to the actual content of the result title 220. In this example, based on a search for the phrase "riddle of the sphinx" as shown in FIG. 10, the resulting page image 222 shows the actual page where the phrase "riddle of the Sphinx" is found, along with a limited number of words preceding and following the search terms. All other words and features on the page image 222, except for the page number, are suppressed. The number of words preceding and following the located search terms may vary according to user preferences and the access rules governing the particular content for the user. In this illustration, nine words are shown preceding and following the phrase "riddle of the Sphinx." In other circumstances, the access rules in the access rights database 120 may permit the user to view a greater portion or even the entire image of "Page 17" (i.e., page image 222) in FIG. 11. Methods for feature suppression described earlier may be used to suppress content in the page image to be displayed in accordance with the access rules in the access rights database.

In short, returning to FIG. 8, after a user has selected particular content from the search results 212 (block 178) and the access rights to the content have been considered (block 180), the image of one or more pages with text corresponding to the search terms are retrieved from the page image database (block 182). Based on the access rights granted to the user, a portion or all of a retrieved page image is displayed to the user (block 184).

Optionally, search terms specified by a user may be highlighted in the page images displayed to the user, as indicated at block 186. The present invention provides a process by which search terms may be highlighted in a manner that reduces the time and resources required for delivering the page image to the user for display.

Rather than formatting a page image 222 with highlighting of search terms at the search server 108 and then delivering the highlighted page 222 to the user, an embodiment of the present invention may proceed to immediately deliver the page image 222 to the user device 102, 104 associated with the user. In the meantime, the search server 108 determines the position and size of the search terms on the page image 222 (information that may be available in the text searchable database 118 as discussed earlier) and delivers that information to the user device 102, 104 associated with the user. The user device 102, 104 may then locally execute program instructions to place a visual indicator on the page image 222 to highlight the location of the search terms. The visual indicator may be an icon placed next to or an underline placed under the search terms. Alternatively, the visual indicator may be a change of font of the search terms as displayed. In a preferred embodiment, the visual indictor is provided by one or more blocks of transparent color that overlay the search terms, thus creating the effect of a colored highlight 224 (FIG. 12) when the page image 222 is displayed. In the latter preferred embodiment, the user device 102, 104 may be instructed to use DHTML layering or Java script technology to cause the user device 102, 104 to produce the highlight 224 on the page image 222.

By having the user device 102, 104 prepare and overlay the color highlight on the search terms, the only information that the search server 108 needs to communicate to the user device 102, 104 (as to highlighting) are the numeric "quads" for each word to be highlighted. As noted earlier, a quad is a set of four numbers that describes the X and Y position as well as width and height of a word on a particular page image. In another embodiment, only the X and Y position of search terms is communicated and a highlight of a standard thickness is layered over the search terms. Minimizing the amount of information that the search server 108 needs to communicate to the user device 102, 104 will reduce the amount of time that it takes to communicate from the search server 108 to the user device 102, 104.

A user's personal library can also be divided as desired into classes of works, such as fiction and nonfiction works, and within such classes, subdivided into subclasses such as mystery, adventure, history, reference, etc. Classes and subclasses of works may be predefined or customized by the user. By restricting searches to particular classes or subclasses of books in the user's personal library, the searches performed by a user may be more focused and helpful to the user. For example, a medical student may define a personal "medical" library in which full text searches of medical texts in the student's personal library are conducted. Furthermore, an algorithm that identifies "related" text may also be used to aid a user's selection of content for the personal library to include content that may not be strictly classified in a particular class but nonetheless be related to a class that the user desires to search. "Related text" algorithms are known in the art and may use dictionary definitions and synonyms of certain words, for example, to identify related content to include in the personalized library that is searched.

While several embodiments have been illustrated and described above, it will be appreciated that various changes can be made therein without departing from the spirit and scope of the invention. For example, the notion of a personal library may be extended from a single person to a small group of persons (constituting a "user"), that know each other and choose to pool the content that they own. A small group of this type may be comprised of family members or persons living in the same apartment or in the same fraternity, etc. Each person in the group can determine the content to be included in the group's personal library. A single searchable set of content is provided to the group. The search results may also be configured to report who in the group owns the book and who currently is in possession of the book.

The description of searching "text" herein can be extended to include searching non-text objects as well, such as pictures, graphs, etc. Searching non-text objects can be accomplished by searching data, such as visible text (e.g., legends or labels), hidden text, and/or metadata, that is associated with or otherwise describes the object at issue. The text searchable database 118 can be constructed to include such visible or hidden text or metadata, with position and size information pointing to the object in the page image at issue.

It should also be understood that providing to the user an image of a page of content does not necessarily imply providing an image having the same dimensions as the original page content. An image of a page of content can be any size and may be adjusted in size to more closely conform to the particular portion of content that the access rules (if any) permit for display. Accordingly, depending on the search terms and the pages of content at issue, a user may receive an image that is only half of the original page, or one paragraph from the page, etc., with the page image being displayed having dimensions that match the portion of the page that is shown.

The scope of the present invention should thus be determined, not from the specific examples described herein, but from the following claims and equivalents thereto.

What is claimed is:

1. A computer-implemented method for providing user access to a body of content from a source, the computer-implemented method comprising:
    providing a user with electronic access to a body of content from a source via a computing system, wherein all of the body of content is initially accessible to the user;
    determining a threshold total amount of content in the body of content that can be accessed, wherein the threshold total amount of content is determined as one of a threshold percentage of the body of content and a threshold number of portions of the body of content;
    measuring, via the computing system, a total of the body of content that has been accessed; and
    when the total of the body of content that has been accessed meets or exceeds the threshold total amount of content, automatically restricting the user from accessing the remaining content in the body of content that has not previously been accessed while allowing the user to electronically access the content in the body that has previously been accessed.

2. The computer-implemented method of claim 1, wherein the content that the user accesses is determined at the time of access.

3. The computer-implemented method of claim 1, wherein the source is a textual work.

4. The computer-implemented method of claim 1, wherein the source is an audio work.

5. The computer-implemented method of claim 1, wherein the source is a video work.

6. The computer-implemented method of claim 1, wherein the body of content is comprised of images of pages of content.

7. The computer-implemented method of claim 1, further comprising monitoring access to the body of content by multiple users, wherein measuring the total of the body of content that has been accessed includes aggregating access information of the multiple users.

8. The computer-implemented method of claim 7, wherein aggregating access information of the multiple users comprises synchronizing multiple databases that record the content accessed by the multiple users.

9. The computer-implemented method of claim 7, wherein the content accessed by one or more users is excluded from the total accessed content.

10. The computer-implemented method of claim 9, wherein access to content by a user who has paid for the access is excluded from the total accessed content.

11. The computer-implemented method of claim 1, wherein the total of the body of content that has been accessed is measured as a percentage of the total body of content.

12. The computer-implemented method of claim 1, wherein the total of the body of content that has been accessed is measured as a number of portions of the body of content.

13. The computer-implemented method of claim 1, wherein if the total of the body of content that has been accessed meets or exceeds the threshold total amount of content and if a request is made by the user to access content that previously has not been accessed, the computer-implemented method further comprises providing a message indicating that the requested content is unavailable.

14. The computer-implemented method of claim 1, further comprising enabling user selection of the content being accessed.

15. The computer-implemented method of claim 14, wherein the content is selected as a result of a search of the body of content based on a search query.

16. The computer-implemented method of claim 1, further comprising providing access to an excerpt of the content that previously has not been accessed and is otherwise restricted from access.

17. The computer-implemented method of claim 1, further comprising receiving an authorized command that enables access to the content that is otherwise restricted from access.

18. The computer-implemented method of claim 1, wherein the threshold total amount of content is determined before the body of content is made available for access.

19. The computer-implemented method of claim 1, wherein the threshold total amount of content is determined after the body of content has been made available for access.

20. The computer-implemented method of claim 1, wherein the threshold total amount of content is determined based on a type of the source.

21. The computer-implemented method of claim 1, wherein the threshold total amount of content is determined based on a type of the content.

22. The computer-implemented method of claim 1, wherein the threshold total amount of content is determined based on an identity of a user.

23. The computer-implemented method of claim 1, wherein the threshold total amount of content is determined based on credentials of a user.

24. The computer-implemented method of claim 1, wherein the threshold total amount of content is determined based on a duration of access to the content.

25. The computer-implemented method of claim 1, wherein the threshold total amount of content varies over time.

26. A computer-implemented method for providing access to content from a source, the method comprising:
monitoring access to content from the source via a computing system;
allowing electronic access to a portion of the content from the source being monitored if the portion of the content satisfies a criteria; and
automatically embargoing a remaining portion of the content from the source from access while allowing electronic access to the previously accessed portion of the content,
wherein the criteria is a limit based on a comparison of an amount of the accessed portion of the content with at least one of a threshold percentage of the body of content that may be accessed and a threshold number of portions of the body of content that may be accessed.

27. The computer-implemented method of claim 26, wherein the amount of the accessed portion of the content is determined as a percentage of the total content of the source.

28. The computer-implemented method of claim 26, wherein the amount of the accessed portion of the content is determined as a number of portions of the content from the source.

29. The computer-implemented method of claim 26, wherein allowing electronic access to the portion of the content comprises;
measuring the portion of the content that has previously been accessed;
comparing the measurement to the limit; and
if the measurement does not exceed the limit, allowing electronic access to the portion of the content.

30. The computer-implemented method of claim 29, wherein the limit varies over time.

31. The computer-implemented method of claim 29, wherein monitoring access to the content from the source comprises monitoring access to the content by multiple users.

32. The computer-implemented method of claim 31, wherein measuring the portion of the content that has previously been accessed comprises:
measuring the portions of the content in aggregate that have been accessed by the multiple users; and
summing the measured portions to obtain a total amount of accessed content.

33. The computer-implemented method of claim 32, wherein summing the measured portions to obtain the total amount of accessed content includes synchronizing multiple databases that record the content accessed by the multiple users.

34. The computer-implemented method of claim 32, wherein the content accessed by one or more users is excluded from the total accessed content.

35. The computer-implemented method of claim 26, wherein the criteria is further based on a type of the content.

36. The computer-implemented method of claim 35, wherein allowing electronic access to the portion of the content comprises;
identifying the type of the portion of the content being monitored;
comparing the type to the criteria; and
if the type satisfies the criteria, allowing electronic access to the portion of the content.

37. The computer-implemented method of claim 26, wherein the portion of the content being accessed is determined at the time of access.

38. The computer-implemented method of claim 26, further comprising providing a message indicating that the embargoed content is unavailable.

39. The computer-implemented method of claim 26, further comprising enabling user selection of the portion of the content.

40. The computer-implemented method of claim 39, wherein the portion of the content is selected as a result of a search of the content based on a search query.

41. The computer-implemented method of claim 39, wherein the portion of the content is selected based on its location in the content from the source.

42. The computer-implemented method of claim 26, further comprising providing selective access to the embargoed portion of content.

43. The computer-implemented method of claim 26, further comprising receiving an authorized command that enables access to the embargoed portion of content.

44. The computer-implemented method of claim 26, further comprising determining the criteria before the content of the source is made available for access.

45. The computer-implemented method of claim 26, further comprising determining the criteria after the content of the source has been made available for access.

46. A computer system for providing electronic access to content from a source, the system comprising:
a database for storing access rules that govern what content may be accessed from a source; and
a computing device in communication with the database, wherein the computing device is configured to:
monitor access to content from the source;
allow electronic access to a portion of the content from the source being monitored if the portion of the content satisfies an access rule stored in the database, wherein allowing electronic access comprises:
measuring an amount of content accessed;
comparing the measured amount of content accessed to the access rule; and
allowing electronic access to the portion of the content from the source when the measurement satisfies the access rule; and
automatically embargo a remaining portion of the content from the source from access while allowing access to the previously accessed portion of the content,
wherein the access rule defines an amount of the content from the source that is available for access, wherein the amount of the content from the source that is available for access is defined as a threshold number of portions of the content.

47. The system of claim 46, wherein the computing device is configured to monitor access to the content from the source by monitoring access to the content by multiple users.

48. The system of claim 47, wherein the computing device is further configured to measure the portion of the content that has previously been accessed by measuring the portions of content in aggregate that have been accessed by the multiple users to obtain a total amount of accessed content.

49. The system of claim 48, wherein the content accessed by one or more users is excluded from the total amount of accessed content.

50. The system of claim 46, wherein the access rule being applied is further based on a type of the content.

51. The system of claim 50, wherein the computing device is configured to allow electronic access to the portion of the content by:
identifying the type of the portion of content being monitored;
comparing the type to the access rule; and
if the type satisfies the access rule, allowing electronic access to the portion of the content.

52. The system of claim 46, wherein the portion of the content being accessed is determined at the time of access.

53. The system of claim 46, wherein the computing device is further configured to provide a message indicating that the embargoed content is unavailable.

54. The system of claim 46, wherein the computing device is further configured to enable user selection of the portion of the content.

55. The system of claim 54, wherein the portion of the content is selected as a result of a search of the content based on a search query.

56. The system of claim 54, wherein the portion of the content is selected based on its location in the content from the source.

57. The system of claim 46, wherein the computing device is further configured to provide selective access to the embargoed portion of content.

58. The system of claim 46, wherein the computing device is further configured to receive an authorized command that enables access to the embargoed portion of content.

59. The system of claim 46, further comprising determining the access rule before the content of the source is made available for access.

60. The system of claim 46, further comprising determining the access rule after the content of the source has been made available for access.

61. A non-transitory computer-accessible medium having instructions encoded thereon that provide electronic access to content from a source, wherein, in response to execution of the instructions by a computing apparatus, the instructions cause the computing apparatus to:
detect access to a portion of the content from the source;
allow electronic access to the portion of the content from the source if the portion of the content satisfies a criteria; and
automatically restrict access to a remaining portion of the content from the source that does not satisfy the criteria when access to the remaining portion is detected, while continuing to allow electronic access to the previously accessed portion of the content,
wherein the criteria is a limit based on a comparison of an amount of the accessed portion of the content with a threshold percentage of the content that may be accessed.

62. The computer-accessible medium of claim 61, wherein the criteria is further based on a type of content.

63. The computer-accessible medium of claim 62, wherein, in response to execution, the instructions further cause the computing apparatus to allow electronic access to the portion of the content by;
identifying the type of the portion of the content that is being accessed,
comparing the type to the criteria, and
if the type satisfies the criteria, allowing electronic access to the portion of the content.

64. The computer-accessible medium of claim 61, wherein, in response to execution, the instructions further cause the computing apparatus to provide electronic access to an excerpt of the remaining portion of content that is otherwise automatically restricted from access.

65. The computer-accessible medium of claim 61, wherein the criteria is determined before the content of the source is made available for access.

66. The computer-accessible medium of claim 61, wherein the criteria is determined after the content of the source has been made available for access.

* * * * *